United States Patent
Onda et al.

(10) Patent No.: US 8,542,192 B2
(45) Date of Patent: Sep. 24, 2013

(54) INFORMATION PROCESSING DEVICE AND PROGRAM

(75) Inventors: Yasushi Onda, Tokyo (JP); Izua Kano, Tokyo (JP); Dai Kamiya, Tokyo (JP); Keiichi Murakami, Tokyo (JP); Eiju Yamada, Tokyo (JP); Kazuhiro Yamada, Tokyo (JP)

(73) Assignee: NTT DoCoMo, Inc., Tokyo (JP)

( * ) Notice: Subject to any disclaimer, the term of this patent is extended or adjusted under 35 U.S.C. 154(b) by 814 days.

(21) Appl. No.: 12/528,898

(22) PCT Filed: Feb. 28, 2008

(86) PCT No.: PCT/JP2008/053472
§ 371 (c)(1),
(2), (4) Date: Jan. 14, 2010

(87) PCT Pub. No.: WO2008/105488
PCT Pub. Date: Sep. 4, 2008

(65) Prior Publication Data
US 2010/0149102 A1   Jun. 17, 2010

(30) Foreign Application Priority Data

Feb. 28, 2007 (JP) ................. 2007-050250

(51) Int. Cl.
*G06F 3/02* (2006.01)
*G06F 3/041* (2006.01)
*G06F 3/048* (2013.01)

(52) U.S. Cl.
USPC ........... 345/168; 345/169; 345/170; 345/171; 345/172; 345/173; 715/790; 715/791; 715/792

(58) Field of Classification Search
USPC ......... 345/168–173; 715/790–792, 798–800, 715/806–807
See application file for complete search history.

(56) References Cited

U.S. PATENT DOCUMENTS 6,463,304 B2   10/2002   Smethers
6,538,670 B1 *   3/2003   Kido ............................ 715/767
(Continued)

FOREIGN PATENT DOCUMENTS

CN   1738328       2/2006
EP   1821177 A1   8/2007
(Continued)

OTHER PUBLICATIONS

Singapore Office Action for SG200905727-4, dated Sep. 16, 2010.
(Continued)

*Primary Examiner* — Amr Awad
*Assistant Examiner* — Andre Matthews
(74) *Attorney, Agent, or Firm* — MKG, LLC

(57) ABSTRACT

An information-processing device includes: multiple keys; a memory that stores key arrangement data indicating an arrangement of said multiple keys; an identification part that identifies each display position of multiple windows displayed on a screen; an allocation part that compares an arrangement of the windows obtained by comparing the display position of each window identified by said identification part with the arrangement of keys displayed by said key arrangement data, and uniquely allocates to said each window a key for selecting the relevant window from among said multiple keys so that the arrangement of said windows and the arrangement of said keys are identical or similar; a notifying part that notifies of the keys allocated by said allocation part; and a selection part that selects the window to which an operated key is allocated when any of the keys notified by said notifying part is operated.

8 Claims, 20 Drawing Sheets

(56) References Cited

U.S. PATENT DOCUMENTS

| | | | |
|---|---|---|---|
| 7,487,467 B1 * | 2/2009 | Kawahara et al. | 715/810 |
| 2003/0197739 A1 * | 10/2003 | Bauer | 345/800 |
| 2005/0149879 A1 | 7/2005 | Jobs et al. | |
| 2005/0219220 A1 | 10/2005 | Kishi et al. | |
| 2006/0037848 A1 | 2/2006 | Kobayashi | |
| 2006/0267804 A1 | 11/2006 | Pham | |

FOREIGN PATENT DOCUMENTS

| | | |
|---|---|---|
| JP | 10-083271 | 3/1998 |
| JP | 2000214977 | 8/2000 |
| JP | 2002-297280 | 10/2002 |
| JP | 2002297280 | 10/2002 |
| JP | 2004179870 | 6/2004 |
| JP | 2005-173087 | 6/2005 |
| JP | 2005216170 | 8/2005 |
| JP | 2006148316 A1 | 6/2006 |

OTHER PUBLICATIONS

Chinese Office Action for CN 200880006487.7, dated Oct. 27, 2010.
Taiwanese Office Action relating to corresponding application dated Oct. 13, 2011, English translation attached.
Chinese Office Action for CN Application No. 200880006487.7 dated Mar. 9, 2011.
Korean Office Action for KR Application No. 10-2009-7017536 dated Feb. 21, 2011.
Australian Office Action dated Apr. 27, 2010.
Chinese Office Action for CN Application No. 200880006487.7 dated Jul. 22, 2011.
European Search Report Communication for corresponding EP Application No. 08720967.2, dated Feb. 26, 2013, pp. 1-3.
European Office Action for corresponding EP Application No. 08720967.2, dated Mar. 14, 2013, pp. 1-7.
Notification of Deficiencies in Patent Application issued in Israeli Patent Application No. 200018 dated Oct. 30, 2012.

* cited by examiner

*FIG. 3A*
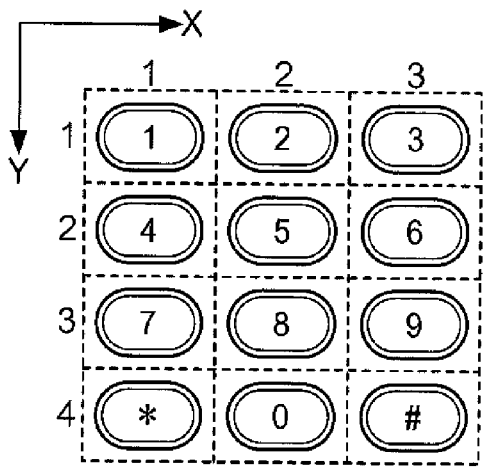
*FIG. 3C*
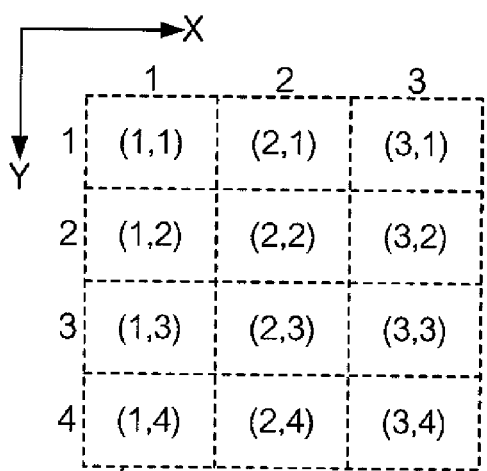
18b: POSITION IDENTIFICATION MATRIX
*FIG. 3B*
18a: SELECTION-KEY CANDIDATE TABLE
| SELECTION KEY | ASSIGNMENT COORDINATE DATA (X,Y) |
|---|---|
| 1 | (1,1) |
| 2 | (2,1) |
| 3 | (3,1) |
| 4 | (1,2) |
| 5 | (2,2) |
| 6 | (3,2) |
| 7 | (1,3) |
| 8 | (2,3) |
| 9 | (3,3) |
| * | (1,4) |
| 0 | (2,4) |
| # | (3,4) |
*FIG. 3D*
18c: SELECTION-KEY ALLOCATION TABLE
| SELECTION KEY | WINDOW |
|---|---|
| 1 | NONE |
| 2 | NONE |
| 3 | WINDOW B |
| 4 | WINDOW C |
| 5 | NONE |
| 6 | WINDOW D |
| 7 | NONE |
| 8 | WINDOW E |
| 9 | NONE |
| * | NONE |
| 0 | NONE |
| # | NONE |

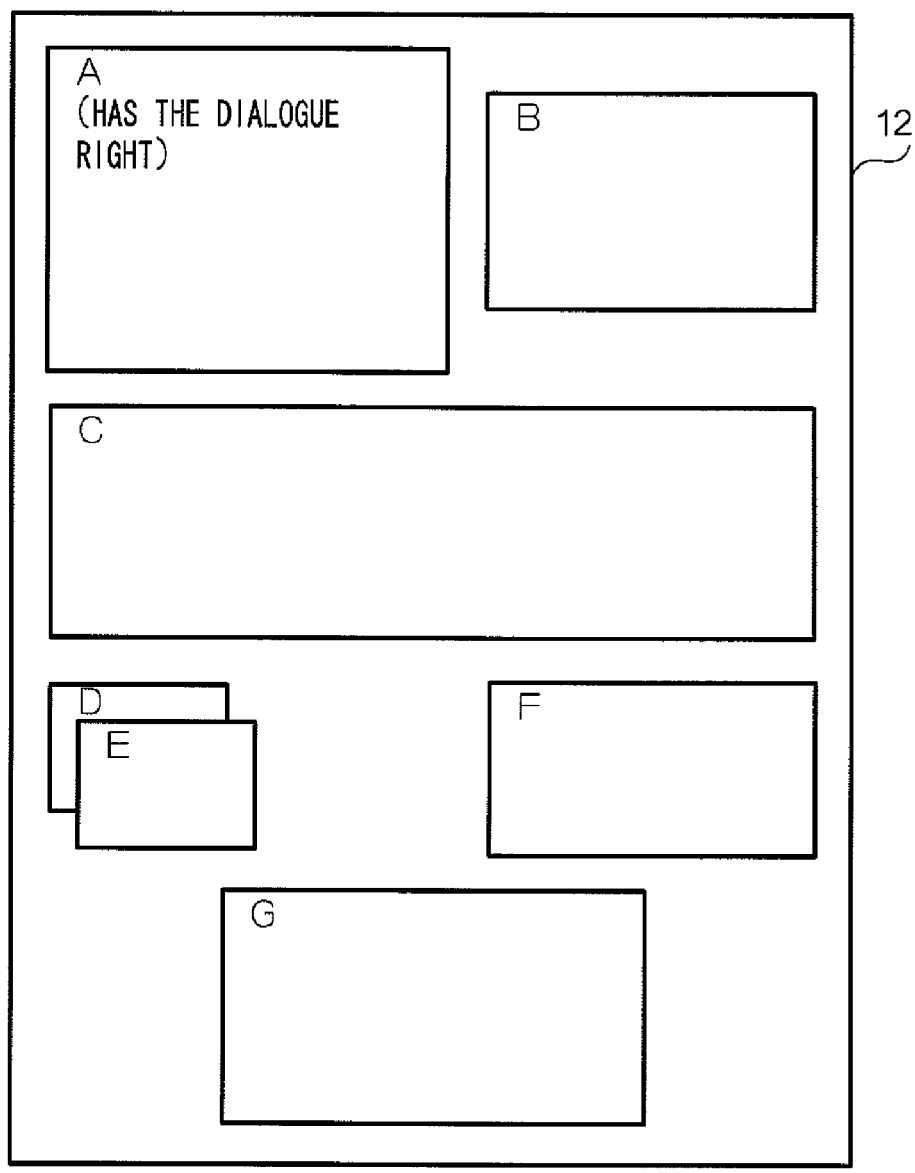

FIG. 17A

| GROUP | RANK | WINDOW |
|---|---|---|
| 1 | 1 | WINDOW B |
| | 2 | WINDOW C |
| | 3 | WINDOW D |
| 2 | 4 | WINDOW F |
| | 5 | WINDOW E |
| | 6 | WINDOW G |
| 3 | 7 | NONE |
| | 8 | NONE |
| | 9 | NONE |
| 4 | 10 | NONE |
| | 11 | NONE |
| | 12 | NONE |

FIG. 17B

| GROUP | RANK | WINDOW | SELECTION KEY |
|---|---|---|---|
| 1 | 1 | WINDOW D | 1 |
| | 2 | WINDOW C | 2 |
| | 3 | WINDOW B | 3 |
| 2 | 4 | WINDOW E | 4 |
| | 5 | WINDOW G | 5 |
| | 6 | WINDOW F | 6 |
| 3 | 7 | NONE | 7 |
| | 8 | NONE | 8 |
| | 9 | NONE | 9 |
| 4 | 10 | NONE | * |
| | 11 | NONE | 0 |
| | 12 | NONE | # |

INFORMATION PROCESSING DEVICE AND PROGRAM

TECHNICAL FIELD

The present invention is related to a GUI (Graphical User Interface).

BACKGROUND OF THE INVENTION

For example, because portability is emphasized for mobile telephones, in most cases, they are not equipped with pointing devices such as a mouse, trackball, or the like. For this reason, compared to personal computers and the like that are equipped with a pointing device, mobile telephones offer poor operability for selecting icons and the like displayed on a screen. In order to resolve such problems related to operability, for example, in Japanese published unexamined application 2004-179870, it is described that multiple icons are displayed in the same arrangement as a ten-keypad, and in addition to starting up the icon in the same arrangement position as a ten-key that is held down, the corresponding numbers of the ten-keys are displayed over each icon. Moreover, in Japanese published unexamined application 2005-216170, as shown in FIG. 4 of this bulletin, it is described that when a displayed image on a mobile telephone is divided into an identical 4×3 matrix form as the key arrangement, a "Game startup" function as well as a key assigned to a position corresponding to block B (4, 3) are allocated to a "Tree" object OBJ4 positioned at block B (4, 3), and when this key is held down, the object OBJ4 is selected and a game is started up.

According to an aspect of the invention, there is provided an information-processing device including: multiple keys; a memory that stores key arrangement data indicating an arrangement of said multiple keys; an identification part that identifies each display position of multiple windows displayed on a screen; an allocation part that compares an arrangement of the windows obtained by comparing the display position of each window identified by said identification part with the arrangement of keys displayed by said key arrangement data, and uniquely allocates to said each window a key for selecting the relevant window from among said multiple keys so that the arrangement of said windows and the arrangement of said keys are identical or similar; a notifying part that notifies of the keys allocated by said allocation part; and a selection part that selects the window to which an operated key is allocated when any of the keys notified by said notifying part is operated.

Incidentally, using the inventions described in the above-mentioned patent literature, the selection of a single window from among multiple windows displayed on a screen may be considered. However, unlike the icons described in Japanese published unexamined application 2004-179870 or the objects described in Japanese published unexamined application 2005-216170, the windows may be freely changed by the user for size and position on the screen. For this reason, for example, as with the icons described in Japanese published unexamined application 2004-179870, by adopting a composition in which multiple windows are displayed on a screen in an identical arrangement as a ten-keypad, it becomes necessary to change the user-configured sizes and positions of the windows. At each time, the user configures the size and/or position of each window for personal usability, and therefore, when those configurations are changed automatically, it becomes troublesome as it requires the user to restore the configurations for personal usability. Moreover, as with the objects described in Japanese published unexamined application 2005-216170, if the composition is one in which ten-keys are allocated in advance to the windows, if the position and/or size is changed, the correlation between the positions of the windows on the screen and the ten-keypad arrangement is lost, thereby making it difficult to know which of the ten-keys to press and causing a decrease in operability.

The present invention is implemented in light of the context described above, and its aim is to enable the selection of a single window from among multiple windows displayed on a screen without equipping a pointing device and without causing a decrease in usability or operability.

A first aspect of this embodiment of the present invention provides an information-processing device that includes: multiple keys; a memory that stores key arrangement data indicating an arrangement of said multiple keys; an identification part that identifies each display position of multiple windows displayed on a screen; an allocation part that compares an arrangement of the windows obtained by comparing the display position of each window identified by said identification part with the arrangement of keys displayed by said key arrangement data, and uniquely allocates to said each window a key for selecting the relevant window from among said multiple keys so that the arrangement of said windows and the arrangement of said keys are identical or similar; a notifying part that notifies of the keys allocated by said allocation part; and a selection part that selects the window to which an operated key is allocated when any of the keys notified by said notifying part is operated.

According to an aspect of this embodiment, the information-processing device compares the arrangement of windows displayed on the screen with the arrangement of keys indicated by the key arrangement data, and allocates to each window a key for selecting the relevant window so that the arrangement of windows and the arrangement of keys are identical or similar.

In addition, said identification part may have a composition in which the display position of each window excludes windows with dialogue rights from among the windows displayed on the screen.

Moreover, said notifying part may have a composition in which, for each window displayed on the screen, an image indicating the key allocated to the relevant window by said allocation part is superimposed and displayed over the relevant window.

Moreover, it may be a composition including an illuminator that illuminates each key of said multiple keys, wherein said notifying part controls said illuminator, and from among said multiple keys, lights the illumination of the key allocated to said each window by said allocation part.

Moreover, it may be a composition including: a determination part that determines whether or not the number of windows displayed on the screen exceeds the number of allocatable keys indicated by said key arrangement data; and a sectioning part that, if said determination part determines there is an excess, sections the screen into multiple regions so that windows of a quantity equal to or less than the number of said allocatable keys are included within a single region, wherein said allocation part allocates a key to each region sectioned by said sectioning part.

Moreover, it may be a composition including: a determination part that determines whether or not the number of windows displayed on the screen exceeds the number of allocatable keys indicated by said key arrangement data; and a configuration part that, if said determination part determines there is an excess, configures a partial region including windows of a quantity equal to or less than the number of said allocatable keys, wherein said allocation part allocates a key to each window displayed within the partial region configured by said configuration part.

Moreover, another aspect of this embodiment of the present invention provides an information-processing device including: multiple keys; a memory that stores key arrangement data indicating an arrangement of said multiple keys; an identification part that identifies each display position of multiple windows displayed on a screen; a retaining part that compares an arrangement of the windows obtained by comparing the display position of each window identified by said identification part with the arrangement of keys indicated by said key arrangement data and, if the arrangement of said windows and the arrangement of said keys are different, retains the display position of said each window; a sorting part that sorts the display position of said each window according to the arrangement of said keys; an allocation part that compares the arrangement of windows after the sorting by said sorting part with the arrangement of said keys, and uniquely allocates to said each window a key for selecting the relevant window from among said multiple keys so that the relevant two arrangements are identical or similar; a notifying part that notifies of the keys allocated by said allocation part; a selection part that selects the window to which an operated key is allocated when any of the keys notified by said notifying part is operated; and a restoration part that, after the selection by said selection part, returns the display position of said each window to the display position of each window retained by said retaining part.

According to an aspect of this embodiment, if the arrangement of the windows displayed on the screen is different from the arrangement of keys indicated by the key arrangement data, upon sorting the display position of each window according to the arrangement of keys, the information-processing device allocates to each window a key for selecting the relevant window so that the arrangement of windows after sorting and the arrangement of keys are identical or similar.

Moreover, in another perspective, the present invention provides a program for causing a computer to realize: an identification function that identifies the display position of each of multiple windows displayed on a screen; an allocation function that compares an arrangement of the windows obtained by comparing the display position of each window identified by said identification function with an arrangement of keys indicated by key arrangement data stored in a memory, and uniquely allocates to said each window a key for selecting the relevant window from among the multiple keys indicated by said key arrangement data; a notifying function that notifies of the keys allocated by said allocation function; and a selection function that selects the window to which an operated key is allocated when any of the keys notified by said notifying function is operated.

Moreover, in yet another perspective, the present invention provides a program for causing a computer to realize: an identification function that identifies the display position of each of multiple windows displayed on a screen; a retaining function that compares an arrangement of the windows obtained by comparing the display position of each window identified by said identification function with an arrangement of keys indicated by key arrangement data stored in a memory and, if the arrangement of said windows and the arrangement of said keys are different, retains the display position of said each window; a sorting function that sorts the display position of said each window according to the arrangement of said keys; an allocation function that compares the arrangement of windows after the sorting by said sorting function with the arrangement of said keys, and uniquely allocates to said each window a key for selecting the relevant window from among multiple keys indicated by said key arrangement data so that the relevant two arrangements are identical or similar; a notifying function that notifies of the keys allocated by said allocation function; a selection function that selects the window to which an operated key is allocated when any of the keys notified by said notifying function is operated; and a restoration function that, after the selection by said selection function, returns the display position of said each window to the display position of each window retained by said retaining function.

According to an aspect of the present invention, a single window may be selected from among multiple windows displayed on a screen without equipping a pointing device and without causing a decrease in usability or operability.

BRIEF DESCRIPTION OF THE DRAWINGS

Exemplary embodiments of the present invention will be described in detail based on the following figures, wherein:

FIG. 3 is a diagram showing a data composition of a selection-key candidate table, a position-identification matrix, and a selection-key allocation table;

FIG. 10 is a fifth example screen display of a mobile telephone;

FIG. 17 is an explanatory diagram of a window switching process;

DETAILED DESCRIPTION

Exemplary embodiments of the present invention will be explained with reference to the drawings.

Figure 1:
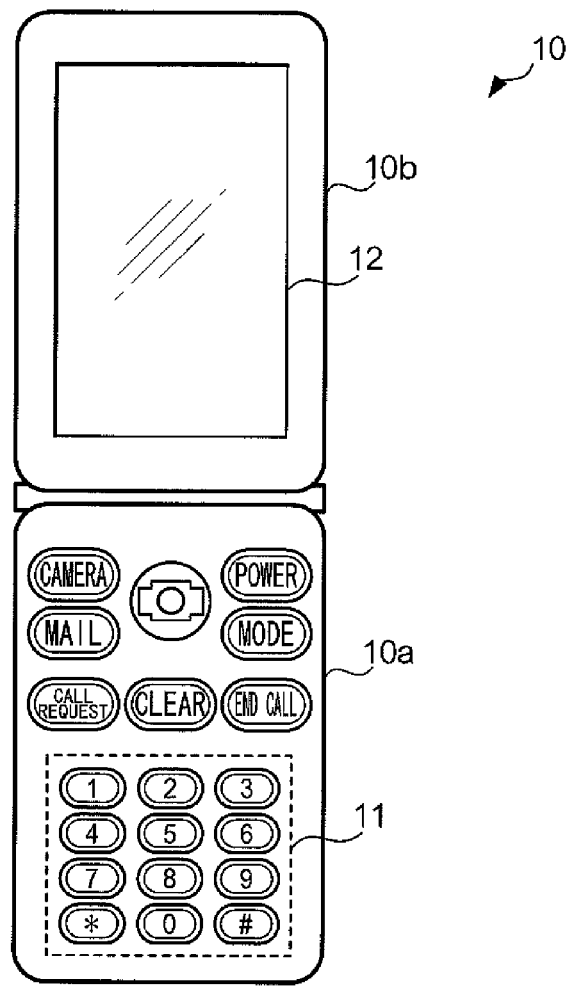
FIG. 1 is a diagram of a mobile telephone in accordance with an embodiment of the present invention.

FIG. 1 is an appearance diagram of a mobile telephone 10 related to the present exemplary embodiment.

As shown in this FIG., a ten-key input part 11 is set on a lower chassis 10a of the mobile telephone 10. On this ten-key input part 11, a total of 12 ten-keys—including the numerals from "0" to "9" and the symbols "*" and "#"—are assigned in a 4×3 (rows×columns) matrix form. In addition, by operating these 12 ten-keys, it is also possible to input hiragana, katakana, alphabetic characters, pictograms, and the like. Moreover, for example, keys for instructions of Call Request, Clear, and End Call, cursor keys, a mode switching key, a power key, and the like are set also on areas other than the ten-key input part 11 on this lower chassis 10a. At the same time, an upper chassis 10b of the mobile telephone 10 is composed of a liquid crystal display panel and is set with a display screen 12 on which characters and images are displayed.

Figure 2:
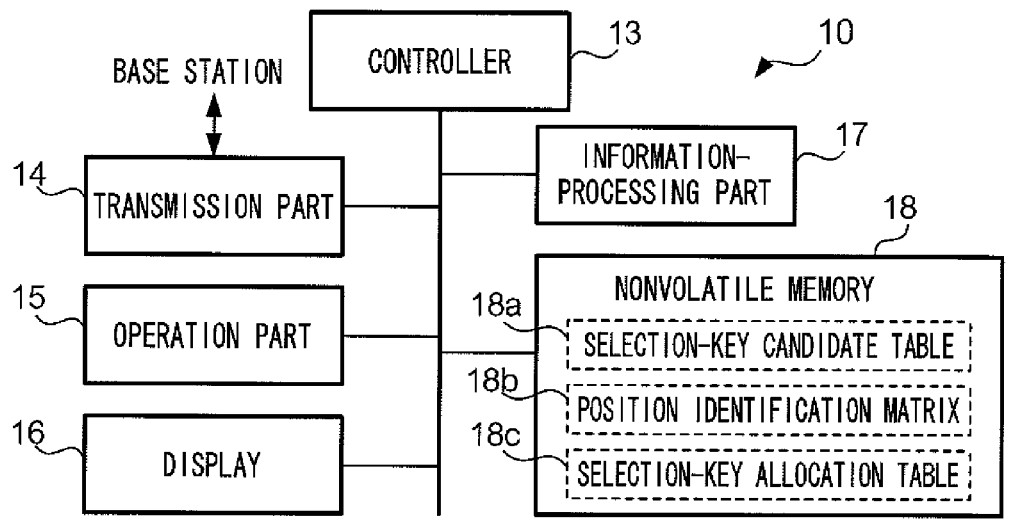
FIG. 2 is a block diagram showing a hardware composition of a mobile telephone in accordance with the present invention.

FIG. 2 is a block diagram showing a hardware composition of the mobile telephone 10.

In this diagram, a controller 13 includes a CPU, ROM, RAM, and the like and controls each part of the mobile telephone 10 by executing programs stored in the ROM or a nonvolatile memory 18. A transmission part 14 performs transmission with a base station of a mobile telephone network or a mobile packet transmission network. An operation part 15 includes the above-mentioned multiple keys and outputs operations signals to the controller 13. A display 16 is composed of a liquid crystal display panel and a drive circuit thereof. A call-processing part 17 includes a microphone, speaker, speech-processing part, or the like and performs call processing. The nonvolatile memory 18 is installed with an operating system (OS) with a built-in GUI function, and display control of windows and switching control of windows with dialogue rights (active windows) are performed by the GUI function of this OS.

In addition, for example, in a Unix (registered trademark) OS, there are many cases in which the GUI function is not included as a kernel, but in such cases, software for a GUI function may be installed separately from the OS on the nonvolatile memory 18. Moreover, the OS includes a multitask function for concurrently performing multiple processes at the same time, and on the display screen 12, for example, a separate window is displayed for each process being concurrently performed. The above-mentioned switching control of the window with the dialogue right refers to switching from a window for delivering user inputs received through the operation part 15 (a process accompanying the execution of the OS or application software) to a separate window displayed on the display screen 12.

Moreover, on the nonvolatile memory 18 are stored a selection-key candidate table 18a, a position identification matrix 18b, and a selection-key allocation table 18c. On the mobile telephone 10, in a window switching process 1 described below, selection keys for selecting windows are individually allocated to multiple windows displayed on the display screen 12, but in the present exemplary embodiment, the total of 12 ten-keys in the ten-key input part 11 shown in FIG. 1 are used as the selection keys. FIG. 3(a) is a further illustration of the assignment of the 12 ten-keys using an X-Y coordinate system. As shown in FIG. 3(b), information indicating each ten-key that may be allocated as a selection key, as well as assignment coordinate data (X, Y) of each ten-key, is registered on the selection-key candidate table 18a. On the mobile telephone 10, it is possible to identify the ten-keys that may be allocated as selection keys, as well as the arrangement of each ten-key, by referring to this selection-key candidate table 18a.

Moreover, as shown in FIG. 3(c), the position identification matrix 18b is a matrix having the same 4×3 (rows×columns) arrangement as the key arrangement of the ten-key input part 11, and is used when determining the ten-keys to be allocated for each window displayed on the display screen 12. Moreover, the selection-key allocation table 18c is a data table that registers and coordinates each window displayed on the display screen 12 with the ten-key information allocated to each window, and, for example, it has the data structure shown in FIG. 3(d). On the mobile telephone 10, it is possible to identify the window corresponding to a ten-key that is held down by referring to this selection-key allocation table 18c.

Figure 4:
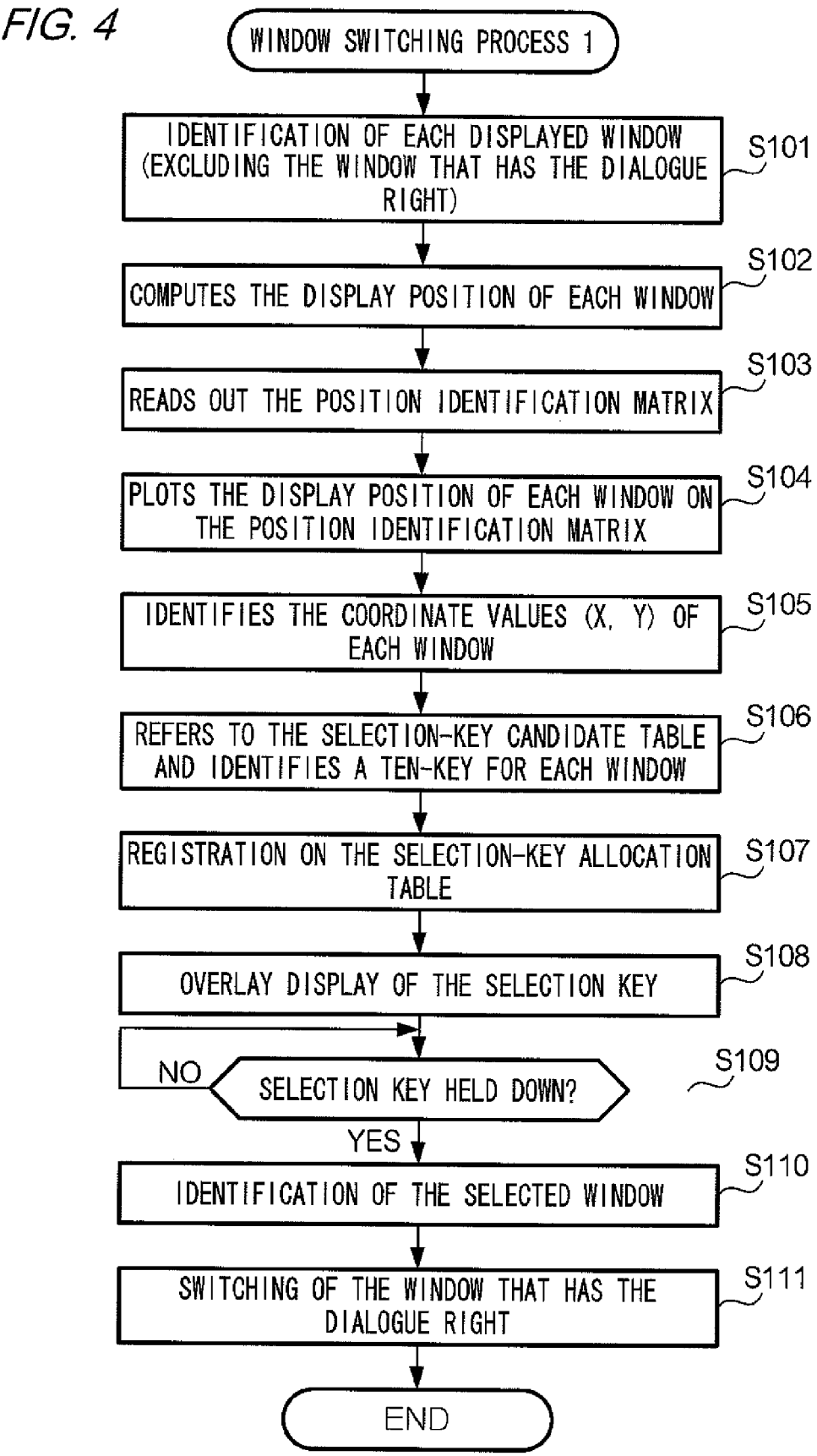
FIG. 4 is a flowchart of a window switching process executed on a mobile telephone.

FIG. 4 is a flowchart of a window switching process 1 executed on a mobile telephone 10. For example, on the mobile telephone 10, if multiple application software are being executed at the same time using a multitask function, a separate window is displayed on the display screen 12 for each application software being executed. If multiple windows are displayed on the display screen 12 as described, when the mode switching key is held down and there is an instruction to switch the window with the dialogue right, the controller 13 starts the window switching process 1. In addition, if there are two windows displayed on the display screen 12, in response to the switching instruction, the dialogue right simply needs to be transferred from the window that has had the dialogue right to the window that has not had the dialogue right. Therefore, the window switching process 1 shown on FIG. 4 is particularly useful for cases in which three or more windows are displayed on the display screen 12.

Figure 5:
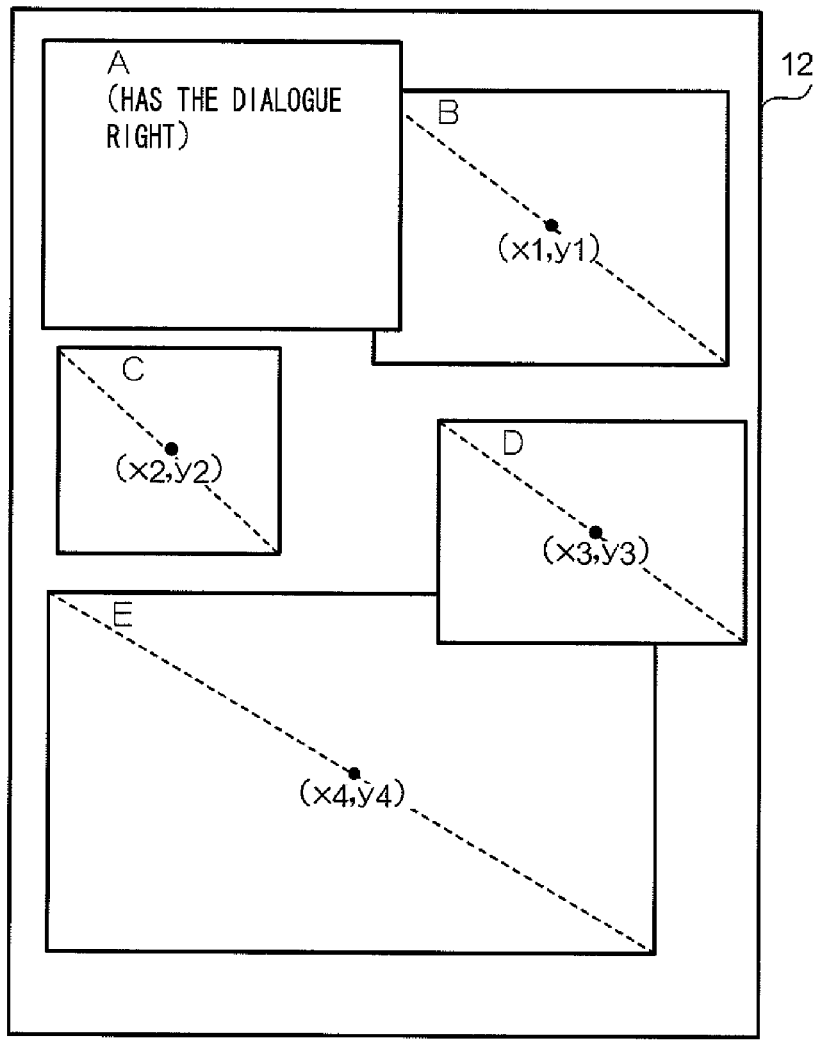
FIG. 5 is a first example screen display of a mobile telephone.

When the window switching process 1 is started, first, the controller 13 identifies each remaining window after excluding the window with the dialogue right at this time from among the multiple windows displayed on the display screen 12 (Step S101). For example, in the example screen display shown in FIG. 5, a total of four windows including window B, window C, window D, and window E and excluding window A that has the dialogue right at this time, are identified. In addition, the window having the dialogue right is excluded because this window is not included among the switching candidates.

Next, the controller 13 computes the display position of each window that has been identified (Step S102). Regarding each window displayed on the display screen 12, for example, the display region is managed by coordinate data of the top-left tip and coordinate data of the bottom-right tip of the window (rectangle), and the controller 13, therefore, computes the central coordinate of those two coordinates (i.e., the central coordinate of the window) for each window and uses this as the display position of each window. For example, in the example screen display shown in FIG. 5, coordinates (x1, y1), (x2, y2), (x3, y3), and (x4, y4) are computed as the display positions of window B, window C, window D, and window E, respectively. In addition, the display position of the windows is not limited to the central coordinates described above, and for example, the coordinates of the top-left tip or the coordinates of the bottom-right tip may be used.

Figure 6A:
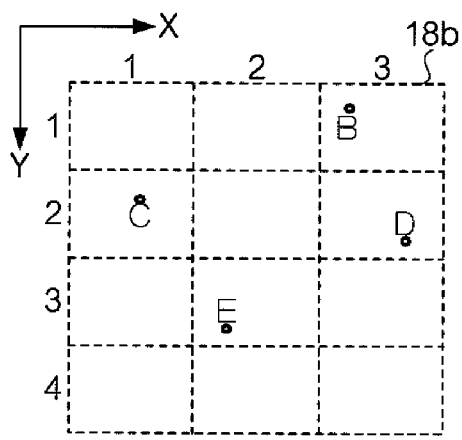
FIG. 6 is a first example plot of the display positions of each window on a position identification matrix.
Figure 6B:
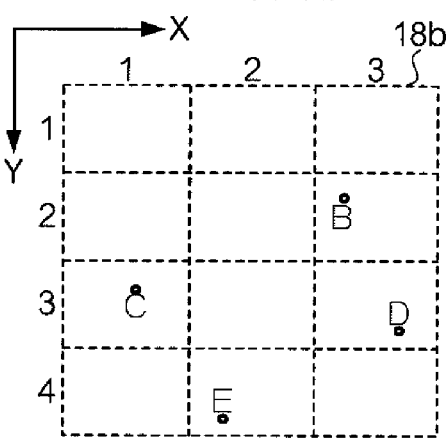

Next, the controller 13 reads out the position identification matrix 18*b* shown in FIG. 3(*c*) from the nonvolatile memory 18 (Step S103). Then, the controller 13 compares the display positions of each window computed in the above Step S102 to comprehend the relative positional relations of each window and, while preserving these relative positional relations, plots the display position of each window on the position identification matrix 18*b* (Step S104). For example, in the case of the example screen display shown in FIG. 5, the display positions of windows B, C, D, and E are plotted on the position identification matrix 18*b* as shown in FIG. 6(*a*) or FIG. 6(*b*) in a state in which their mutual relative positional relations are preserved.

After this, the controller 13 identifies the coordinate values (X, Y) of each window on the position identification matrix 18*b*. For example, in the case of the position identification matrix 18*b* shown in FIGS. 6(*a*), (3, 1), (1, 2), (3, 2), and (2, 3) are identified as the coordinate values of window B, window C, window D, and window E, respectively. Moreover, in the case of the position identification matrix 18*b* shown in FIGS. 6(*b*), (3, 2), (1, 3), (3, 3), and (2, 4) are identified as the coordinate values of window B, window C, window D, and window E, respectively.

Next, the controller 13 refers to the selection-key candidate table 18*a* and identifies the ten-key corresponding to the coordinate values (X, Y) of each window (Step S106). For example, in the case of the position identification matrix 18*b* shown in FIG. 6(*a*), ten-key "3", ten-key "4", ten-key "6", and ten-key "8" are identified as the ten-keys corresponding to coordinate values (3, 1) of window B, (1, 2) of window C, (3, 2) of window D, and (2, 3) of window E, respectively. The ten-keys identified for each window in this Step S106 are the ten-keys allocated for each window.

When the ten-keys that are allocated to each window are determined in this manner, the controller 13 then coordinates the information of each window with the information of the ten-key allocated to each window and registers them on the selection-key allocation table 18*c* (Step S107). For example, in the case of the example shown in FIG. 6(*a*), as shown in FIG. 3(*d*), ten-key "3" and window B, ten-key "4" and window C, ten-key "6" and window D, and ten-key "8" and window E are each coordinated and registered on the selection-key allocation table 18*c*.

Figure 7:
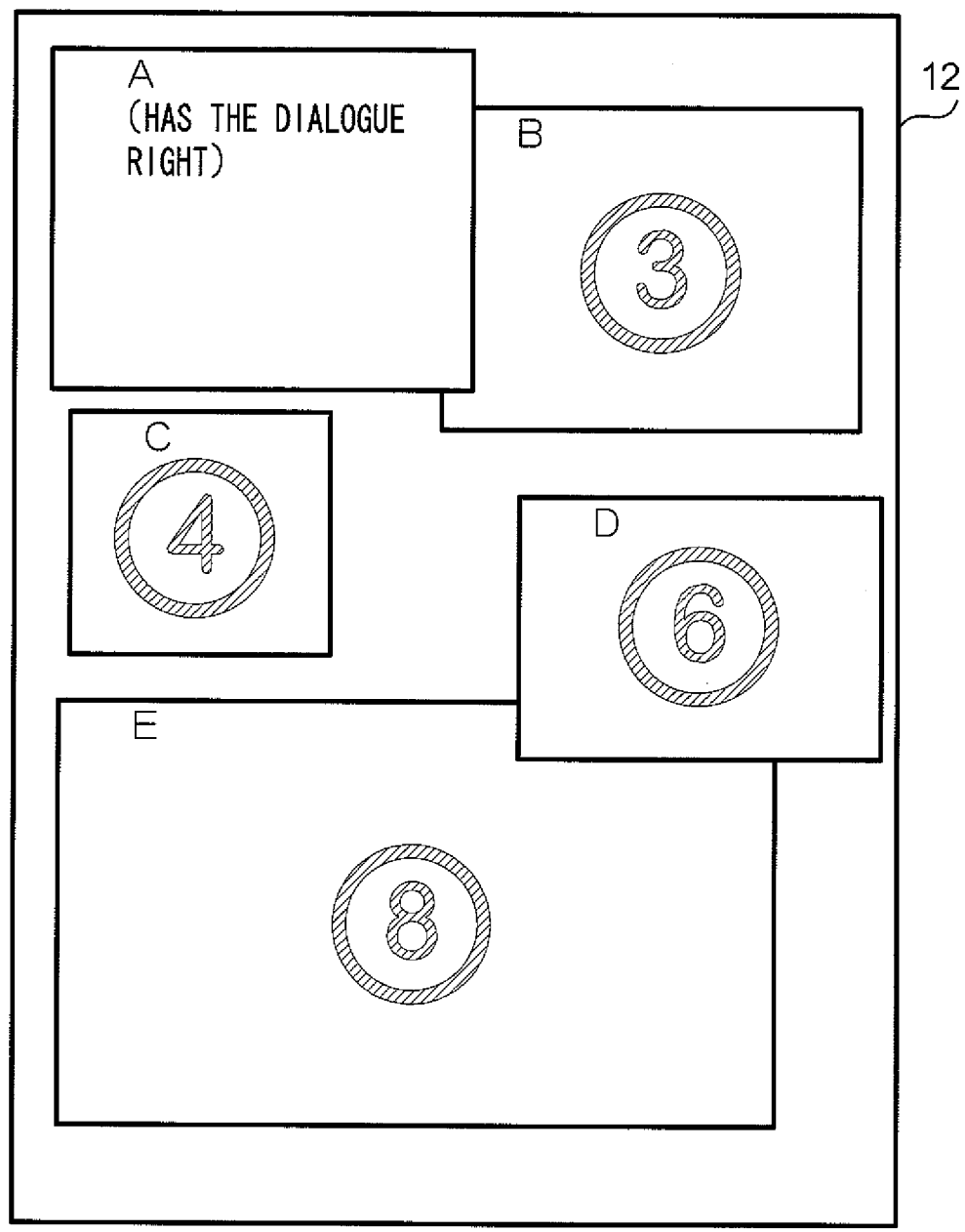
FIG. 7 is a second example screen display of a mobile telephone.
Figure 8:
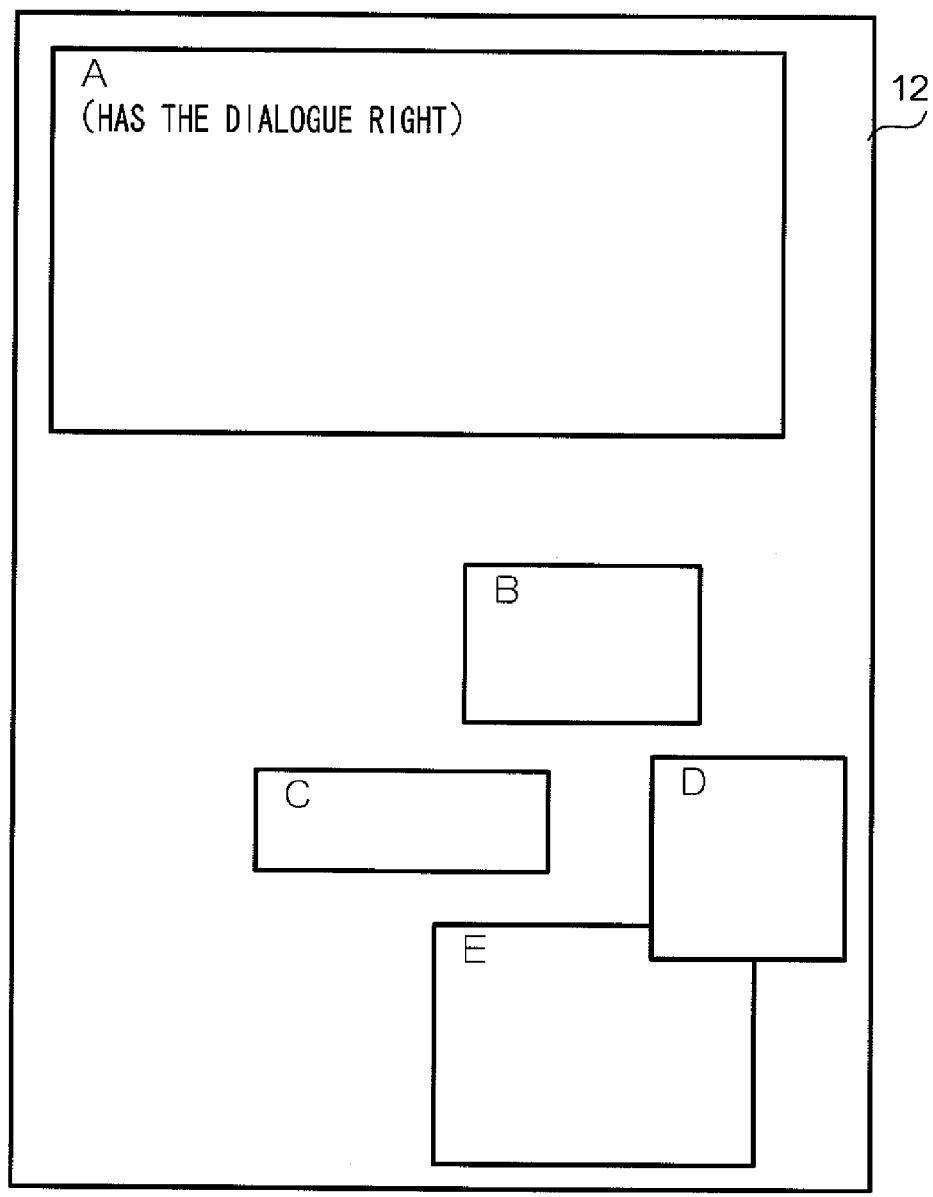
FIG. 8 is a third example screen display of a mobile telephone.
Figure 9:
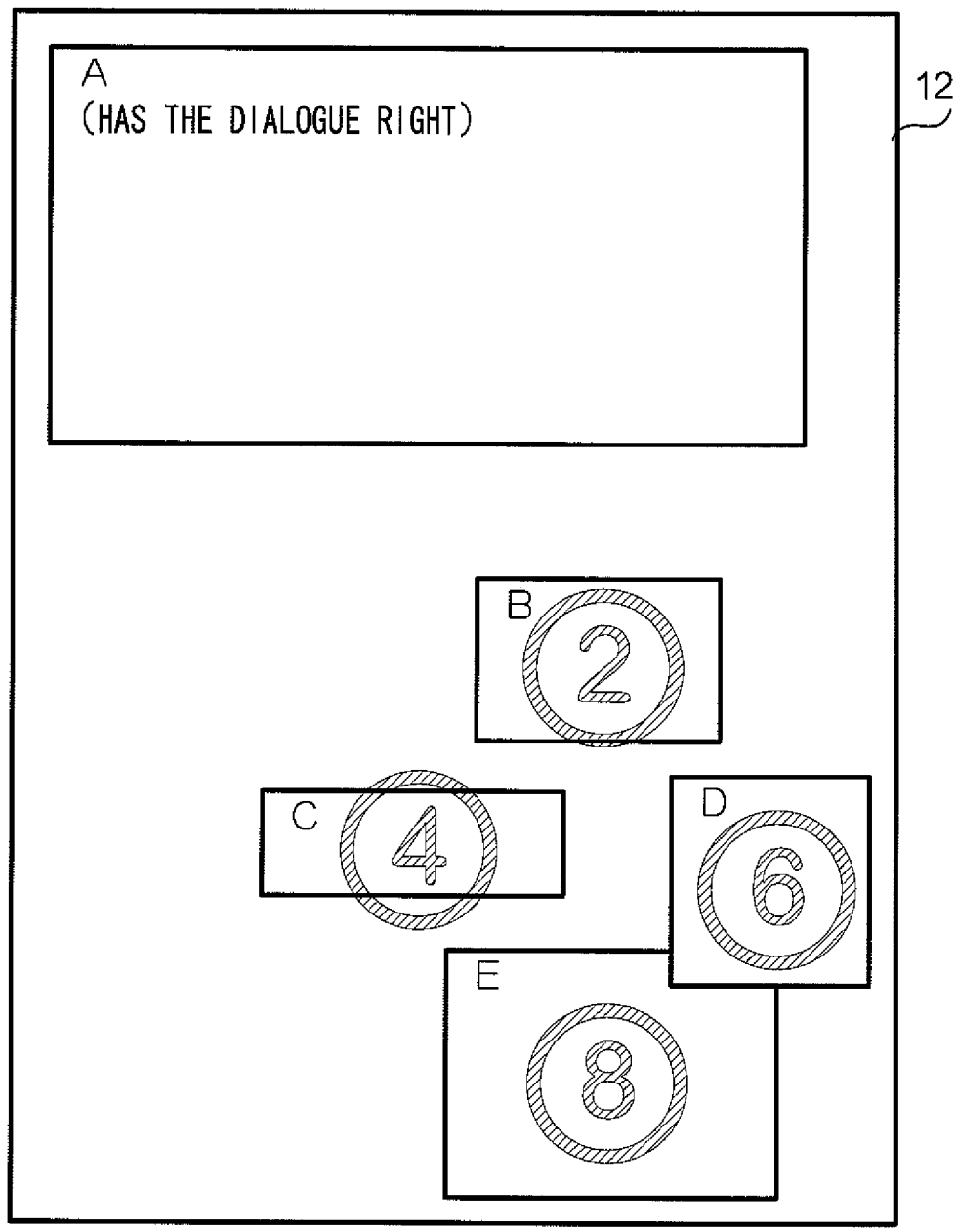
FIG. 9 is a fourth example screen display of a mobile telephone.

After this, the controller 13 superimposes and displays an image indicating the ten-key allocated to each window over the corresponding window (Step S108). For example, as in the example screen display shown in FIG. 7, an image of the ten-key "3", an image of the ten-key "4", an image of the ten-key "6", and an image of the ten-key "8" are superimposed and displayed over window B, window C, window D, and window E, respectively. In addition, this example screen display shown in FIG. 7 corresponds to FIG. 6(*a*), and in the case of FIG. 6(*b*), an image of the ten-key "6", an image of the ten-key "7", an image of the ten-key "9", and an image of the ten-key "0" are superimposed and displayed over window B, window C, window D, and window E, respectively. Moreover, in the case of the example image display shown in FIG. 8, as shown in FIG. 9, an image of the ten-key "2", an image of the ten-key "4", an image of the ten-key "6", and an image of the ten-key "8" are superimposed and displayed over window B, window C, window D, and window E, respectively.

Next, the controller 13 determines whether any of the ten-keys that are superimposed and displayed has been held down (Step S109). As a result, if a ten-key that is different from the keys that are superimposed and displayed is held down (Step S109: NO), the wrong ten-key has been pressed, and the controller 13, therefore, displays a message indicating that an operational error has occurred and returns to Step S109. On the other hand, if any of the ten-keys that is superimposed and displayed is held down (Step S109: YES), the controller 13 refers to the selection-key allocation table 18*c* and identifies the window that is allocated to the ten-key being held down (Step S110). For example, in the state of the example screen display shown in FIG. 7, window B or window D is identified when the ten-key "3" or the ten-key "8", respectively, is held down. Moreover, in the state of the example screen display shown in FIG. 9, window C or window D is identified when the ten-key "4" or the ten-key "6", respectively, is held down.

After switching the dialogue right to the window identified in the above Step S110 (Step S111), the controller 13 completes the window switching process 1. According to this switching process, the delivery destination of subsequent user inputs received through the operating part 15 is changed to the switched window. For example, in the state of the example screen display shown in FIG. 7, when the ten-key "3" is held down, the controller 13 switches the window having the dialogue right from window A to window B. Moreover, when the ten-key "8" is held down, the controller 13 switches the window having the dialogue right from window A to window D.

Figures 11A, 11B:
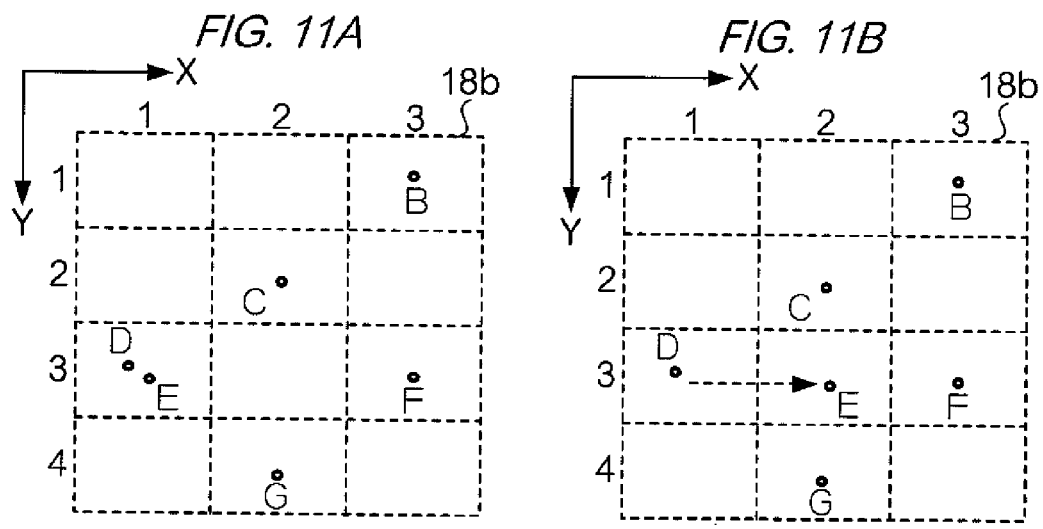
FIG. 11 is a second example plot of the display positions of each window on a position identification matrix.

Incidentally, for example, in the case of the example screen display shown in FIG. 10, in the above Step S104, if the display position of each window B to G, excluding window A that has the dialogue right, is plotted on the position-identification matrix 18*b*, as shown in FIG. 11(*a*), window D and window E will be included in the same grid (coordinate values (3, 1)). In this case, if the ten-key "7" corresponding to the coordinate values (3, 1) is allocated to both window D and window E, when the ten-key "7" is held down, it is not possible to determine whether window D has been selected or window E has been selected.

Figure 12:
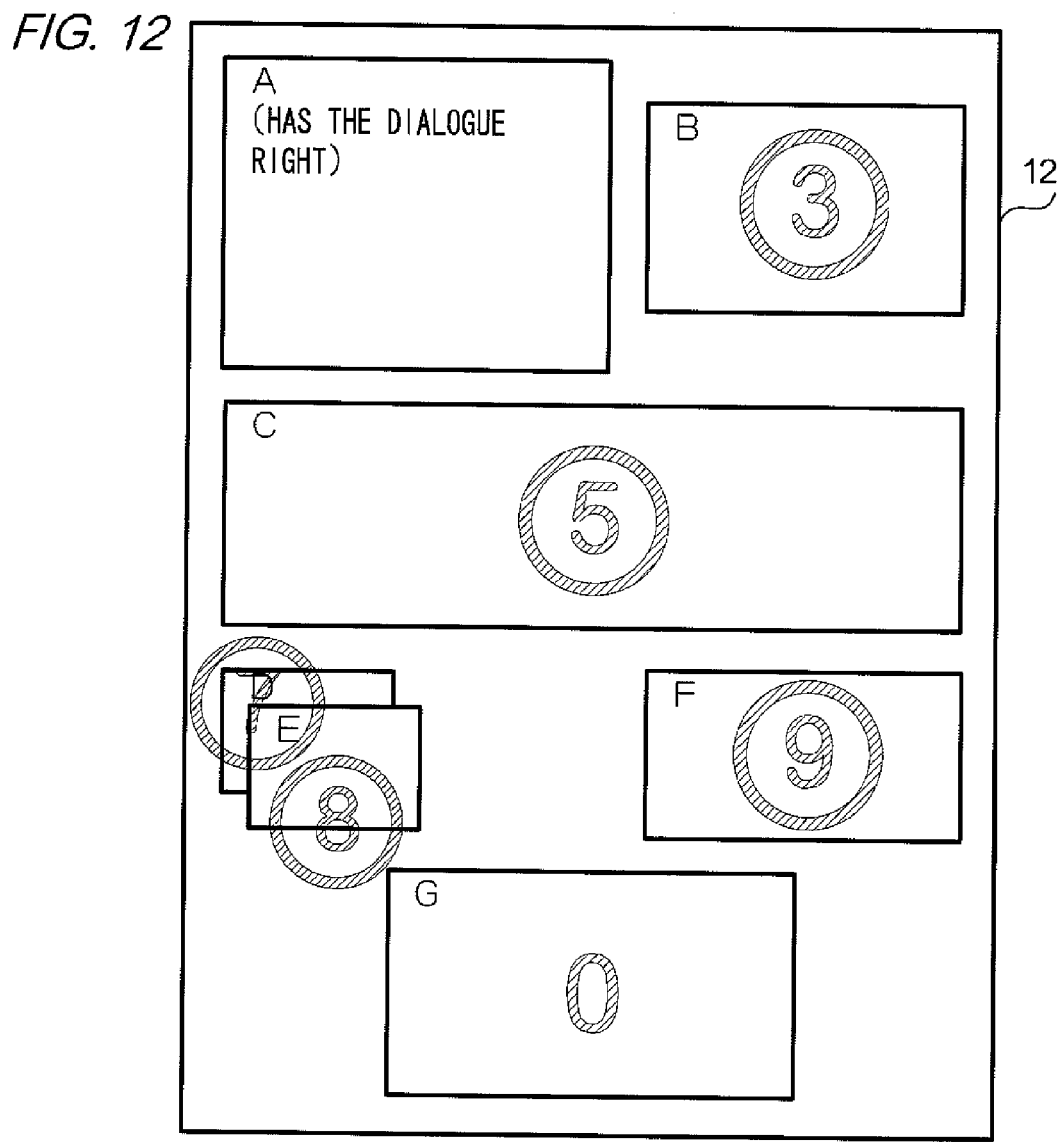
FIG. 12 is a sixth example screen display of a mobile telephone.

Consequently, if the display positions of multiple windows are plotted on the same grid as in this case, regarding the display positions of the multiple windows plotted within the same grid, the controller 13 leaves the display position of one window and transfers the display position of the other window to an adjacent grid where a display position of a window has not been plotted. For example, in the case of the example shown in FIG. 11(*a*), regarding the display positions of window D and window E that have been plotted within the grid for coordinate values (3, 1), as shown in FIG. 11(*b*), the controller 13 leaves the display position of window D within the grid for coordinate values (3, 1) while transferring the display position of window E to within the grid for the adjacent coordinate values (3, 2) and allocates a ten-key. In this case, as in the example screen display shown in FIG. 12, ten-key "7" and ten-key "8" are allocated for window D and window E, respectively.

Of course, in the case of the example shown in FIG. 11(*a*), the controller 13 may transfer the display position of window E to within the grid for the adjacent coordinate values (4, 1). In this case, the ten-key "*" is allocated to window E. Moreover, the controller 13 may leave the display position of window E within the grid for the coordinate values (3, 1) while transferring the display position of window D to within the grid for the adjacent coordinate values (2, 1). In this case, ten-key "4" and ten-key "7" are allocated for window D and window E, respectively.

Figure 13:
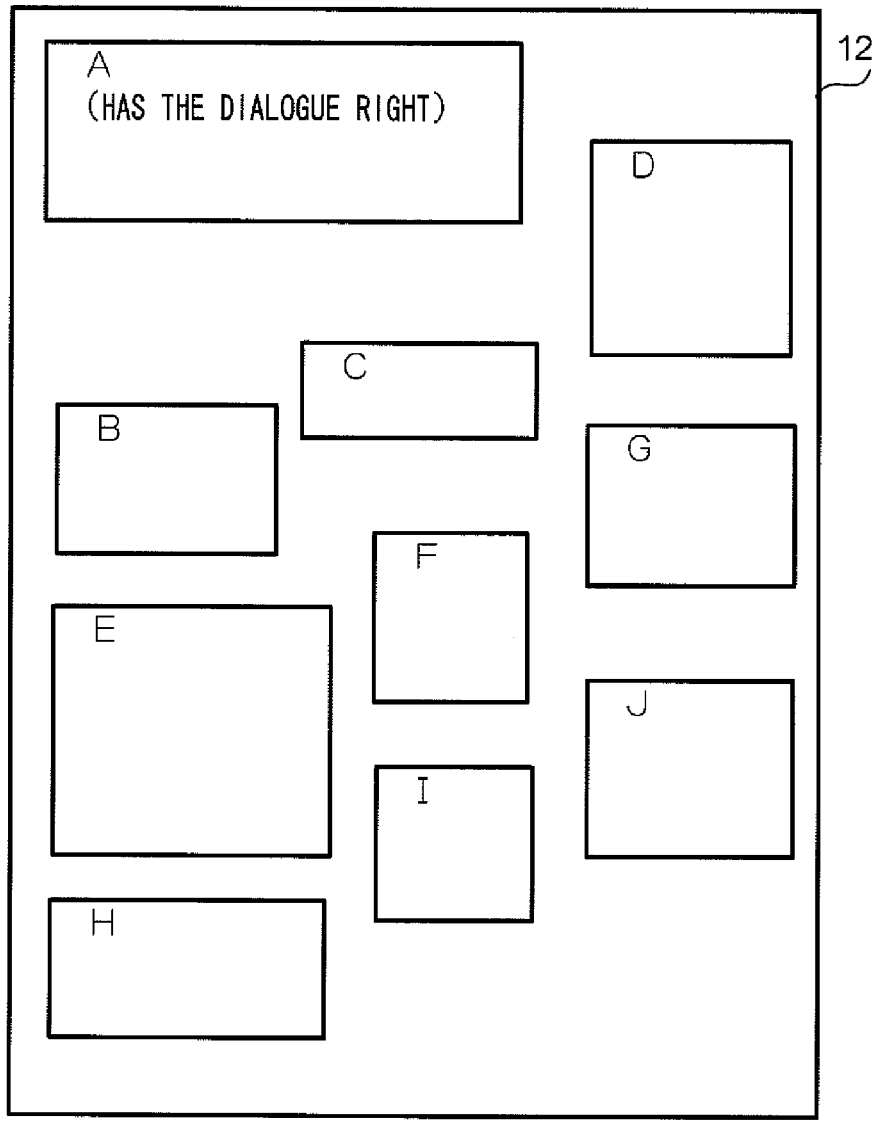
FIG. 13 is a seventh example screen display of a mobile telephone.
Figure 14:
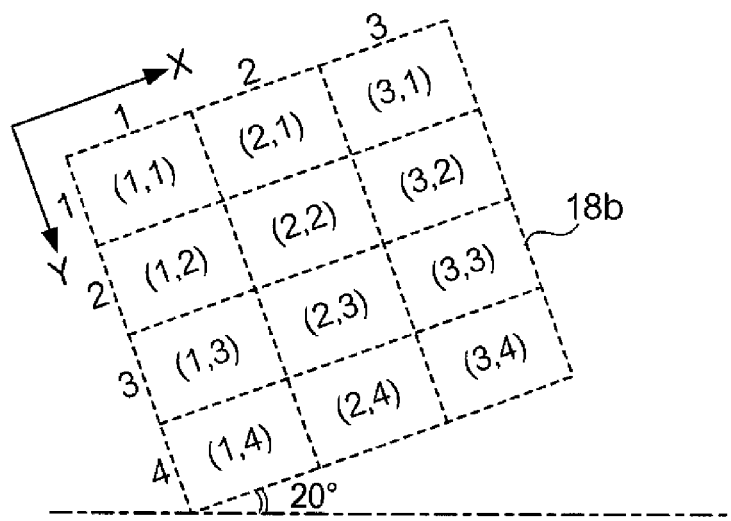
FIG. 14 is a diagram showing a modified example of a position identification matrix.
Figure 15:
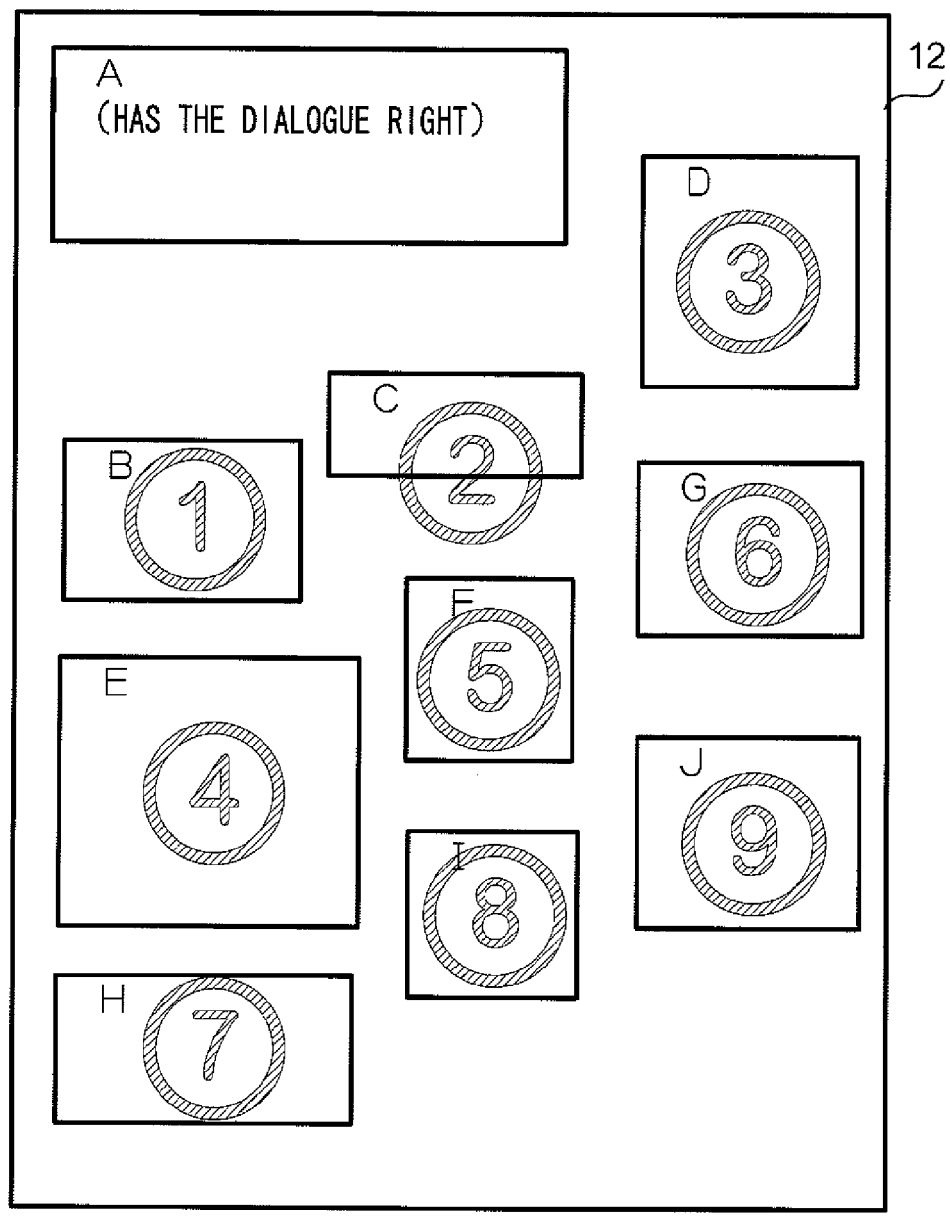
FIG. 15 is an eighth example screen display of a mobile telephone.

Moreover, in the case of the example screen display shown in FIG. 13, the controller 13 may transform and use the angle of the position identification matrix 18b by an angle of +20° as shown in FIG. 14, for example. In this case, after identifying the display position of each window B to J, excluding window A that has the dialogue right, the controller 13 compares the display positions of each window B to J, comprehends the relative positional relations of each window B to J, and determines the angle for transforming the position identification matrix 18b so that the display position of each window B to J appropriately fits within a grid. In addition, in the case of the example screen display shown in FIG. 13, by using the position identification matrix 18b shown in FIG. 14, ten-keys are allocated to each window B to J as in the example screen display shown in FIG. 15. Moreover, as a matter of course, the composition may be one in which a position identification matrix transformed by an angle of +20° or a position identification matrix transformed by an angle of +30° may be retained in advance within the nonvolatile memory 18. Moreover, as shown in FIG. 14, the composition may be one in which, rather than transforming the position identification matrix 18b, upon implementing a transformation process to transform the display position of each window B to J by an angle of −20° in, for example, the example screen display shown in FIG. 13, the transformation-processed display position of each window B to J is plotted on the position identification matrix 18b.

According to an aspect of the present exemplary embodiment described above, the mobile telephone 10 identifies the display position of each remaining window after excluding the window with the dialogue right from among the windows displayed on the display screen 12, compares an arrangement of the windows obtained by comparing the display position of each window with an arrangement of the ten-keys stored in the selection-key candidate table 18a, and allocates a selection key to each window to reflect the arrangement of the ten-keys. Consequently, a single window may be selected from among the multiple windows displayed on the display screen 12 without equipping a pointing device—such as a mouse, trackball, or the like—and without causing a reduction in usability or operability.

Figure 16:
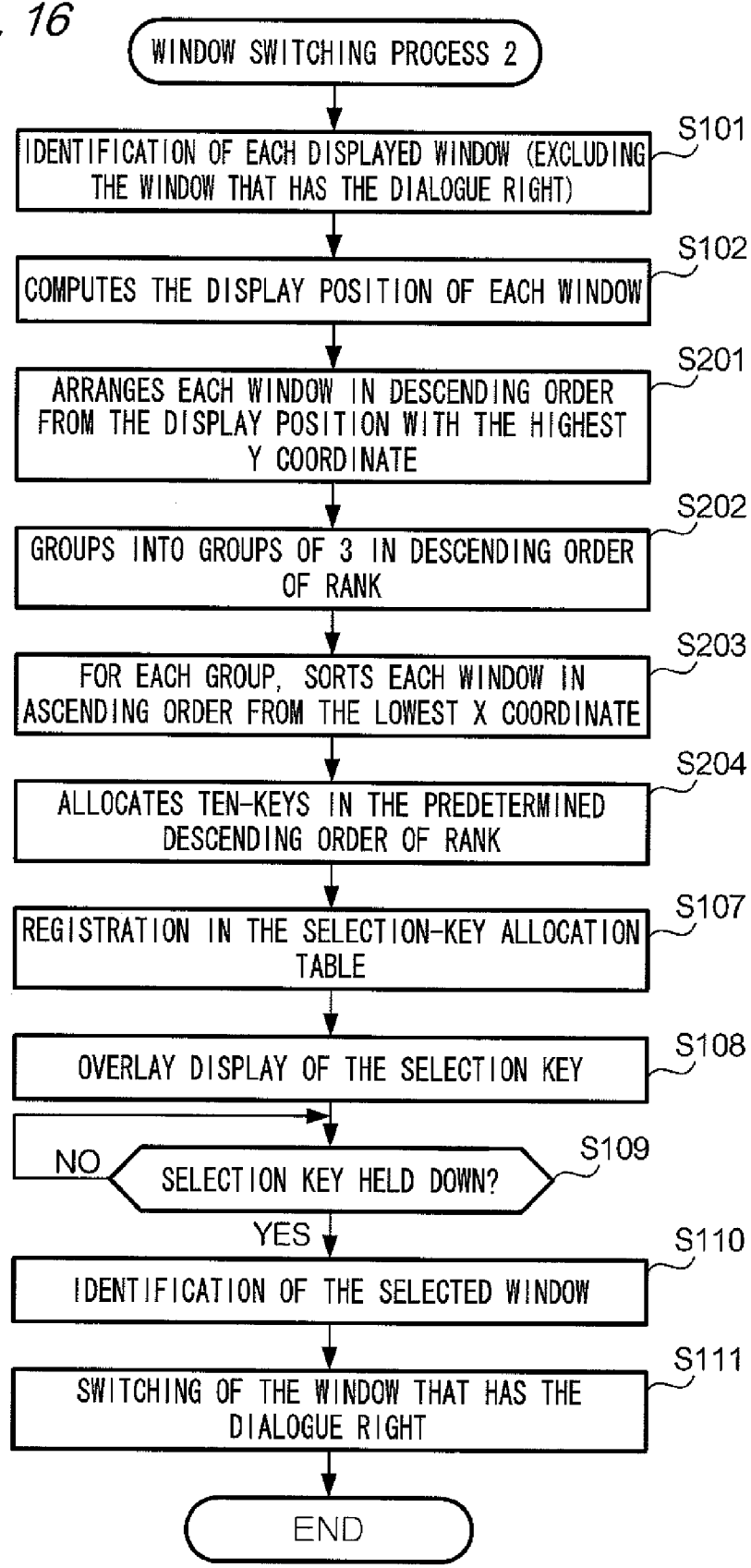
FIG. 16 is a flowchart of a window changeover process executed on a mobile telephone in relation to a first modified example.

The controller 13 may have a composition that executes the window switching process 2 shown in FIG. 16. In addition, in the flowchart of the window switching process 2 shown in this figure, for steps performing the same processes as in the window switching process 1 shown in FIG. 4, the same step numbers have been attached. Moreover, in the following description of the actions, descriptions of steps performing the same processes as in the window switching process 1 shown in FIG. 4 will be abbreviated.

As in the case of the window switching process 1 shown in FIG. 4, when a mode switching key is held down and there is an instruction to switch the window with the dialogue right, the controller 13 of the mobile telephone 10 starts the window switching process 2. When the window switching process 2 is started, first, the controller 13 identifies each remaining window after excluding the window with the dialogue right from among the multiple windows displayed on the display screen 12 (Step S101). For example, in the example screen display shown in FIG. 10, a total of six windows including windows B to G are identified. Next, the controller 13 computes the display position of each window that has been identified (Step S102). In addition, for the coordinate data (x, y) of the display screen 12, the bottom-left tip of the display screen 12 (rectangle) is (0, 0), wherein the y-coordinate value increases in the upward direction and the x-coordinate value increases in the rightward direction.

Next, the controller 13 arranges each window identified in the above Step S102 in descending order from the display position with the highest y-coordinate value (Step S201). For example, in the case of the example screen display shown in FIG. 10, the controller 13 arranges the windows B to F in descending order from the display position with the highest y-coordinate value as shown in FIG. 17(a). After this, the controller 13 groups each arranged window into groups of three in descending order of rank (Step S202). That is, the windows ranked 1 to 3, the windows ranked 4 to 6, the windows ranked 7 to 9, and the windows ranked 10 to 12 become group 1, group 2, group 3, and group 4, respectively. In the case of the example shown in FIG. 17(a), windows B, C, and D are sorted into group 1 and windows F, E, and G are sorted into group 2.

Next, for each group, the controller 13 sorts each window into ascending order from the display position with the lowest x-coordinate value (Step S203). For example, in the case of the example shown in FIG. 17(a), window D, window C, and window B in group 1 are sorted in that order, while window E, window G, and window F in group 2 are sorted in that order (refer to FIG. 17(b)).

After this, the controller 13 allocates ten-key "1", ten-key "2", ten-key "3", ten-key "4", ten-key "5", ten-key "6", ten-key "7", ten-key "8", ten-key "9", ten-key "*", ten-key "0", and ten-key "#" in order from the window ranked 1 (Step S204). For example, in the case shown in FIG. 17(b), ten-key "1", ten-key "2", ten-key "3", ten-key "4", ten-key "5", and ten-key "6" are allocated to window D, window C, window B, window E, window G, and window F, respectively.

Figure 18:
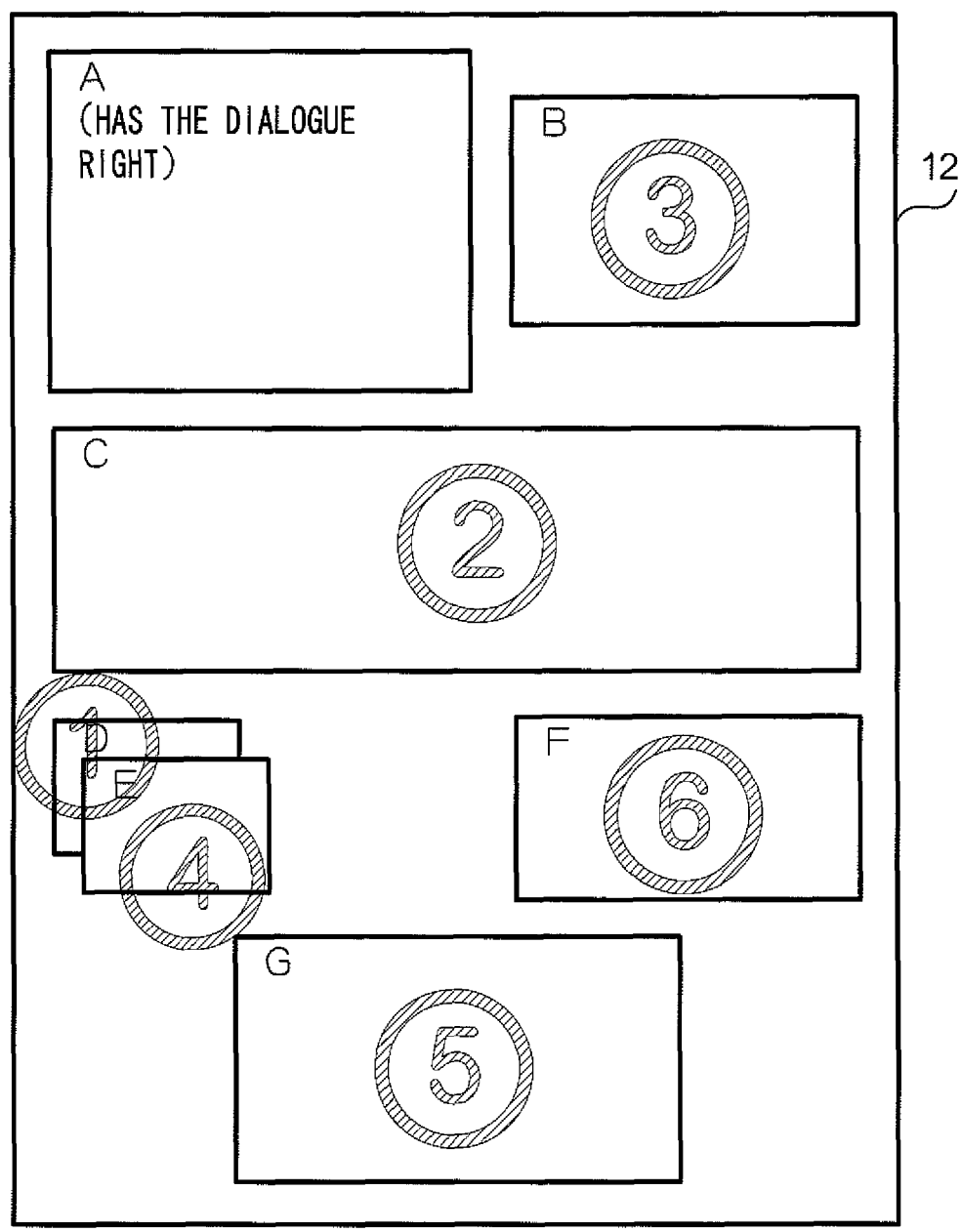
FIG. 18 is an example screen display related to an embodiment of the present invention.

When the ten-keys that are allocated to each window are determined in this manner, the controller 13 then coordinates the information of each window with the information of the ten-key allocated to each window and registers them on the selection-key allocation table 18c (Step S107). Then, the controller 13 superimposes and displays an image indicating the ten-key allocated to each window over the corresponding window (Step S108). For example, in the case of the example shown in FIG. 17(b), as in the example screen display shown in FIG. 18, an image of ten-key "1", an image of ten-key "2", an image of ten-key "3", an image of ten-key "4", an image of ten-key "5", and an image of ten-key "6" are superimposed and displayed over window D, window C, window B, window E, window G, and window F, respectively.

Next, the controller 13 determines whether any of the ten-keys that are superimposed and displayed have been held down (Step S109). As a result, if a ten-key that is different from the keys that are superimposed and displayed is held down (Step S109: NO), the controller 13 displays a message indicating that an operational error has occurred and returns to Step S109. On the other hand, if any of the ten-keys that is superimposed and displayed is held down (Step S109: YES), the controller 13 refers to the selection-key allocation table 18c and identifies the window that is allocated to the ten-key being held down (Step S110). For example, in the state of the example screen display shown in FIG. 18, window D or window F is identified when the ten-key "1" or the ten-key "6", respectively, is held down.

After switching the dialogue right to the window identified in the above Step S110 (Step S111), the controller 13 completes the window switching process 2. According to this switching process, the delivery destination of subsequent user inputs received through the operating part 15 is changed to the switched window. For example, in the state of the example screen display shown in FIG. 18, when the ten-key "1" is held down, the controller 13 switches the window having the dialogue right from window A to window D. Moreover, when the ten-key "6" is held down, the controller 13 switches the window having the dialogue right from window A to window F. Even with the window switching process 2 described above, a selection key can be allocated to each window to reflect the arrangement of the ten-keys.

Figure 25A:
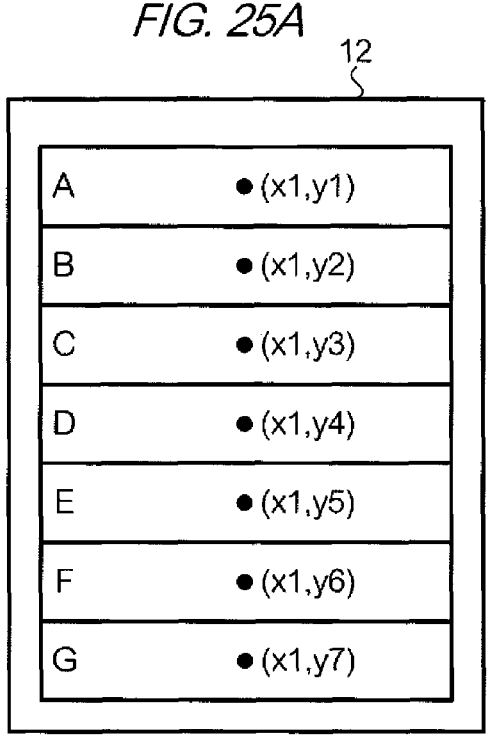
FIG. 25 is an example screen display related to an embodiment of the present invention.
Figure 25B:
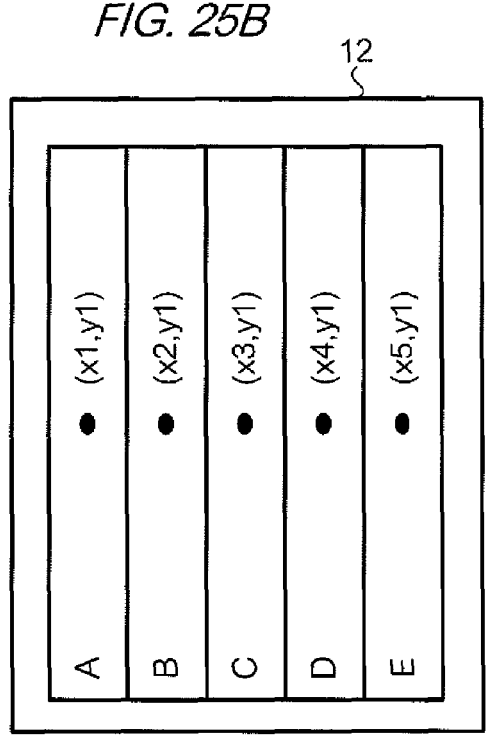

Incidentally, as shown in FIG. 25(*a*), if the seven windows A to G having the same horizontal width (width in the x-axis direction) are assigned and arranged vertically (y-axis direction), the x-coordinate value of the display position of each window A to G computed in the above-mentioned Step S102 becomes the same value (x1) in all cases. When the window switching process 2 is performed for the windows A to G shown in this FIG. 25(*a*) (refer to FIG. 16), ten-keys "1" to "7" are allocated in order to the windows A to G (however, this is for cases in which sorting is not performed because the x-coordinates in the above Step S203 are of the same value). Even with this type of method of allocating selection keys, because the ten-keys "1" to "7" are allocated in order from window A, which is located the highest, downward, although there is no loss of operability, the arrangement of the ten-keys is not suitably reflected in the allocation of a selection key to each window.

Therefore, after computing the display position of each window in Step S102 of the window switching process 2, the x-coordinate value of each is compared, and if the x-coordinate value of each window is the same value or is a value within a predetermined acceptable range, it is determined that each window is assigned and arranged vertically, and after sorting each window in descending order from the largest y-coordinate value, ten-key "1", ten-key "4", ten-key "7", ten-key "*", ten-key "2", ten-key "5", ten-key "8", ten-key "0", ten-key "3", ten-key "6", ten-key "9", and ten-key "#" may be allocated in order from the window ranked 1. With such a composition, in the case of the example shown in FIG. 25(*a*), ten-key "1", ten-key "4", ten-key "7", ten-key "*", ten-key "2", ten-key "5", and ten-key "8" are allocated to window A, window B, window C, window D, window E, window F, and window G, respectively, and the arrangement of the ten-keys may be reflected to some extent in the allocation of a selection key to each window A to G.

Moreover, as shown in FIG. 25(*b*), if the five windows A to E having the same vertical width (width in the y-axis direction) are assigned and arranged horizontally (x-axis direction), the y-coordinate values from among the display position of each window A to E becomes the same value (y1) in all cases. When the window switching process 2 is performed for the windows A to E shown in FIG. 25(*b*), because the y-coordinate value of each window A to E is the same value, in the above Step S201, there are cases in which selection keys cannot be allocated appropriately to reflect the arrangement of the ten-keys because grouping based on sorting cannot be performed properly.

Therefore, after computing the display position of each window in Step S102 of the window switching process 2, the y-coordinate value of each is compared, and if the y-coordinate value of each window is the same value or is a value within a predetermined acceptable range, it is determined that each window is assigned and arranged vertically, and after sorting each window in ascending order from the largest x-coordinate value, ten-key "1", ten-key "2", ten-key "3", ten-key "4", ten-key "5", ten-key "6", ten-key "7", ten-key "8", ten-key "9", ten-key "*", ten-key "0", and ten-key "#" may be allocated in order from the window ranked 1. With such a composition, in the case of the example shown in FIG. 25(*b*), ten-key "1", ten-key "2", ten-key "3", ten-key "4", and ten-key "5" are allocated to window A, window B, window C, window D, and window E, respectively, and the arrangement of the ten-keys may be reflected to some extent in the allocation of a selection key to each window A to E.

Figure 19:
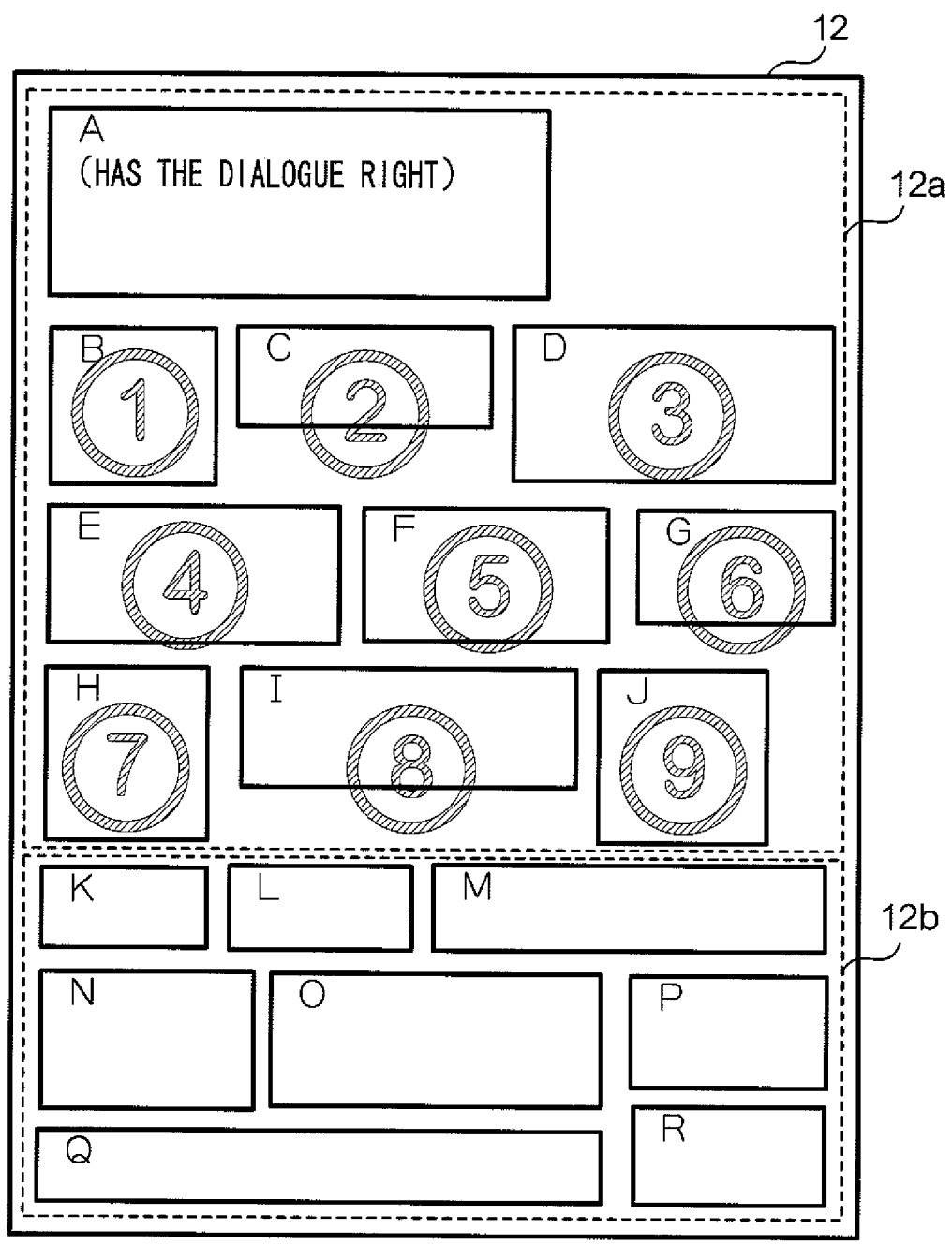
FIG. 19 is a first example screen display related to an embodiment of the present invention.

For example, as in the example screen display shown in FIG. 19, if the number of the windows B to R, excluding window A that has the dialogue right, displayed on the display screen 12 exceeds the number of "12" ten-keys that are allocatable as selection keys, the controller 13 sections the display screen 12 into regions 12*a*, 12*b* that include 12 or fewer windows and allocates ten-keys for each sectioned window 12*a*, 12*b*. At this time, transition from the region 12*a* to the region 12*b* is performed in response to holding down of the cursor key. Of course, such sectioning of regions may be performed with a pattern such as that shown in FIG. 26(*a*).

Figure 26A:
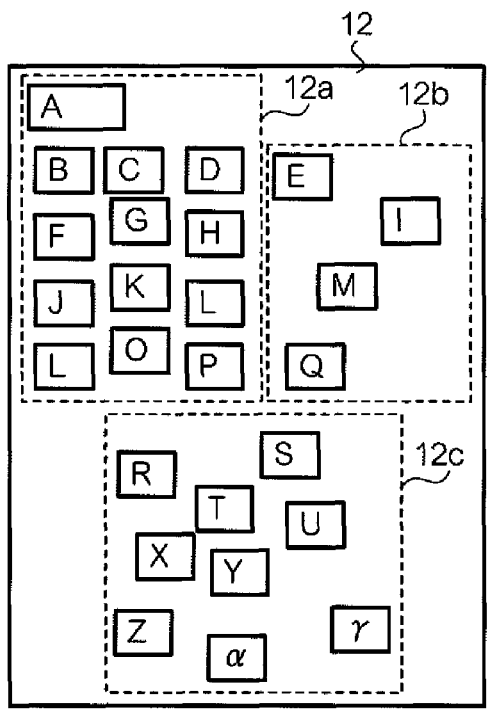
FIG. 26 is an example screen display related to an embodiment of the present invention.
Figure 26B:
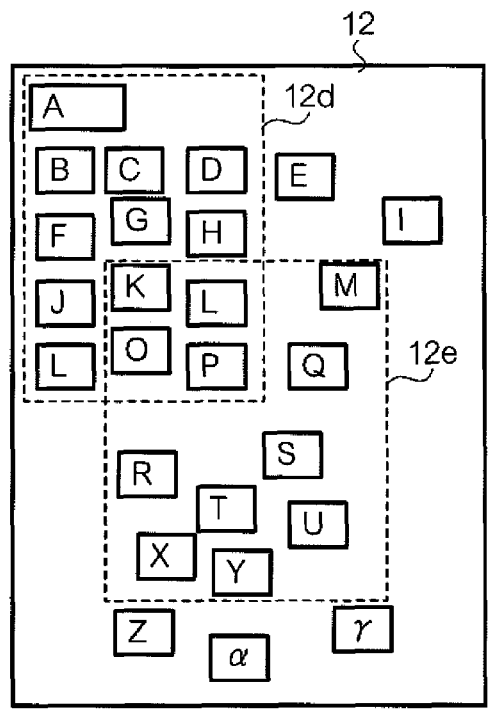

Moreover, as shown in FIG. 26(*b*), it may be that when window A is selected using the cursor key, based on window A, a partial region 12*d* that includes windows of the same quantity or less than the number of allocatable ten-keys is configured, and a ten-key is allocated to each window displayed within this partial region 12*d*, while if window K is selected using the cursor key, based on window K, a partial region 12*e* that includes window of the same quantity or less than the number of allocatable ten-keys is configured, and a ten-key is allocated to each window displayed within this partial region 12*e*. In addition, in the example shown in this figure, a case in which a partial region is configured so that the window selected using the cursor fits in the top-left end within the region has been described, but it may also be a composition that configures a partial region so that the window selected using the cursor fits in the center within the region.

Figure 20:
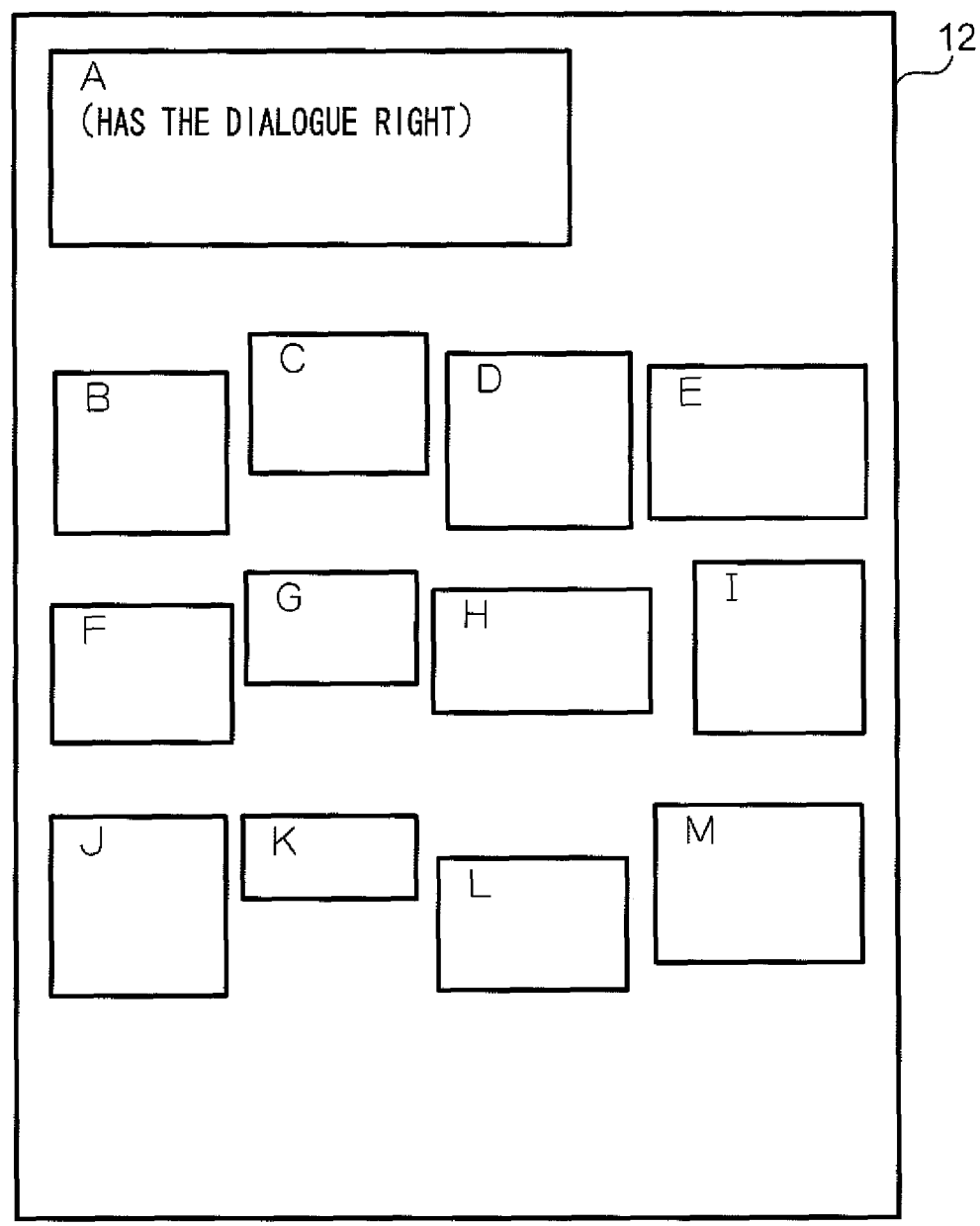
FIG. 20 is a second example screen display related to a an embodiment of the present invention.
Figure 21:
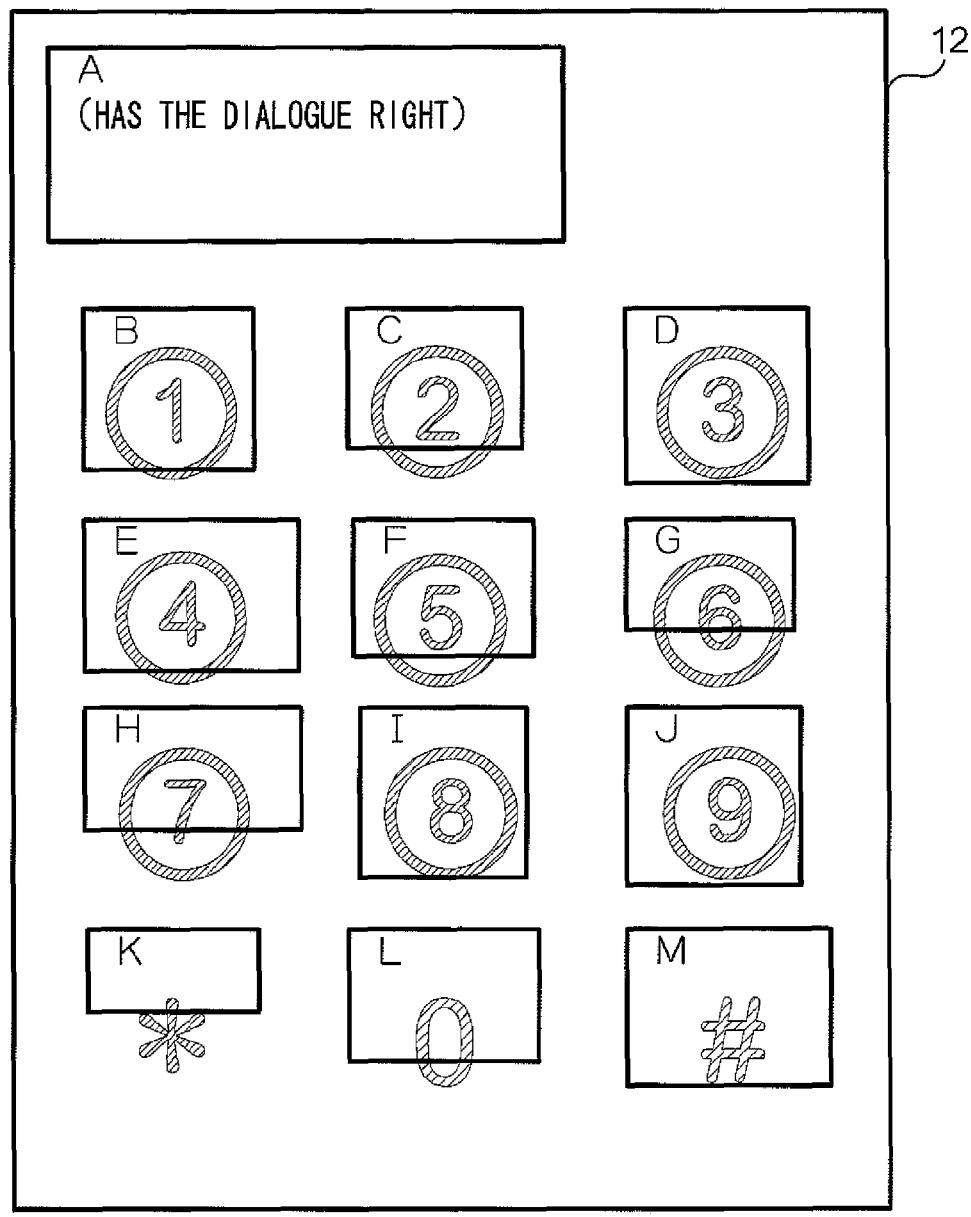
FIG. 21 is a third example screen display related to an embodiment of the present invention.

Moreover, as shown in FIG. 20, if the arrangement (3 rows×4 columns) of each window B to M, excluding window A that has the dialogue right, displayed on the display screen 12, is different from the arrangement (4 rows*3 columns) of the ten-keys that are allocatable as selection keys, upon comparing and detecting the arrangement of the windows obtained by comparing the display position of each window with the arrangement of the ten-keys stored in the selection-key candidate table 18*a*, the controller 13 first identifies the display position of each window A to M and stores it in the nonvolatile memory 18, after which it sorts the display position of each window B to M according to the arrangement (4 rows*3 columns) of the ten-keys as shown in FIG. 21, and after this, it allocates the ten-keys and switches the window that has the dialogue right. Then, after completing the window switching process, the controller 13 returns each window A to M to its original display position according to the display position of each window A to M stored in the nonvolatile memory 18. In addition, it may also be a composition in which the size of each window A to M is also stored along with the display position in the nonvolatile memory 18, wherein the size of each window B to M is changed during the sorting of each window B to M and, after the switching process is completed, each window A to M is returned to its original display state according to the display position and size of each window A to M stored in the nonvolatile memory 18. Of course, a RAM may be used instead of the nonvolatile memory 18 for storing information related to these display positions and sizes.

In the above-mentioned exemplary embodiment and modified example 1, cases in which the dialogue right is transferred to a newly selected window have been described, but when multiple windows are superimposed and displayed, the window to which the dialogue right is transferred may be displayed in the foreground in this manner. Moreover, it may be a composition in which the newly selected window is simply displayed in the foreground without transferring the dialogue right from the original window. Moreover, a window may simply be selected without transferring the dialogue right or changing the display order. However, in this case, it is necessary to display the window that is ultimately selected using a blinking display, a different color, or the like so that the user may identify which window has been selected.

Figure 22:
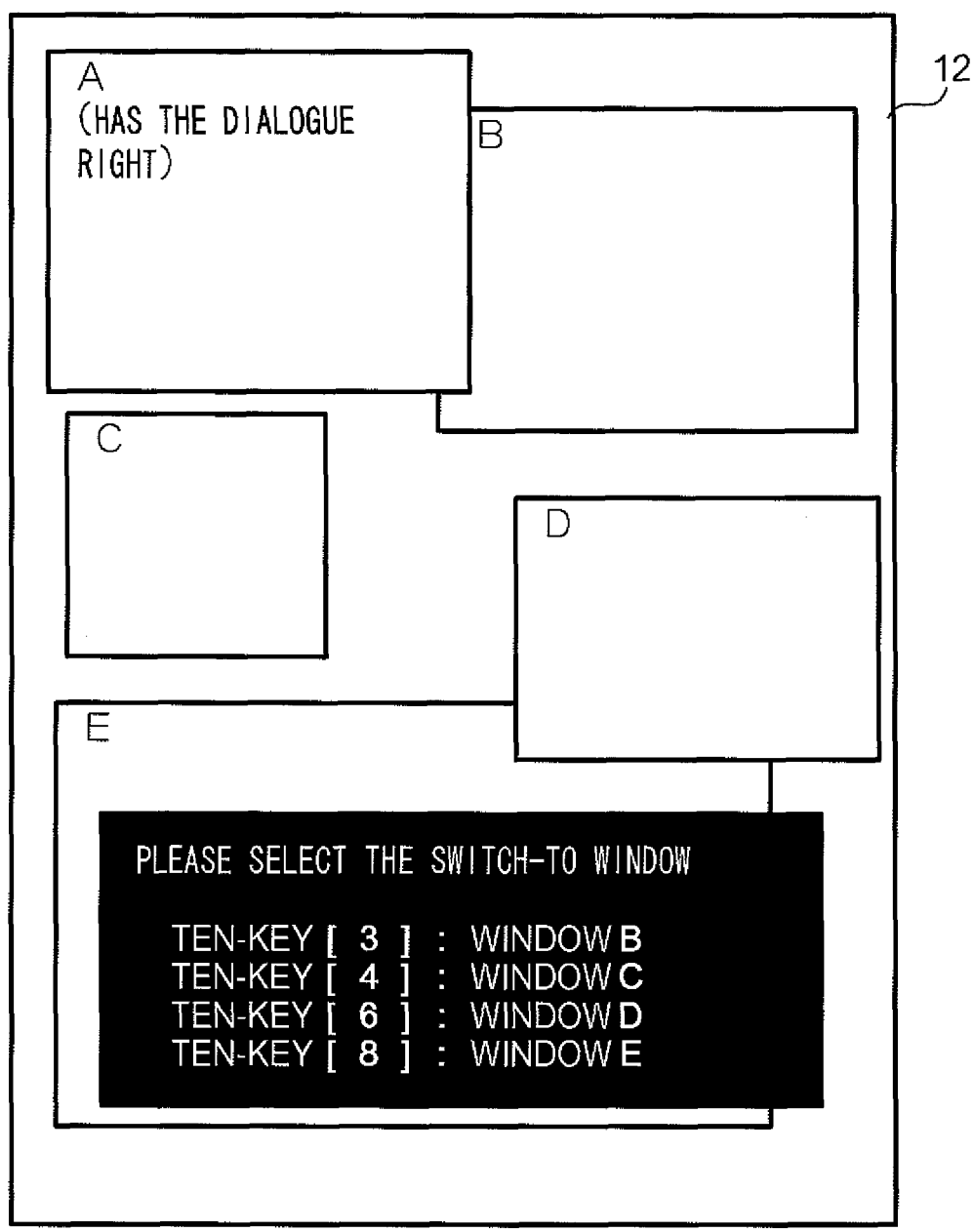
FIG. 22 is an example screen display related to an embodiment of the present invention.

After superimposing and displaying the images of the ten-keys in Step S108 of the window switching processes 1, 2, the controller 13 may have a composition which, for a ten-key input part 11, enables only operation of the superimposed and displayed ten-keys while disabling operation of the ten-keys that are not superimposed and displayed. Moreover, instead of superimposing and displaying an image of the ten-key allocated to each window, as shown in FIG. 22, it may be a composition in which information of the ten-key allocated to each window may be displayed as a message on the display screen 12. Of course, it may be a composition in which such a message is notified as a voice message. Moreover, in the above-mentioned exemplary embodiment and modified example (1), of the windows displayed on the display screen 12, a selection key is not allocated to the window that has the dialogue right, but it may be a composition in which a selection key is also allocated to the window that has the dialogue right.

Figure 23:
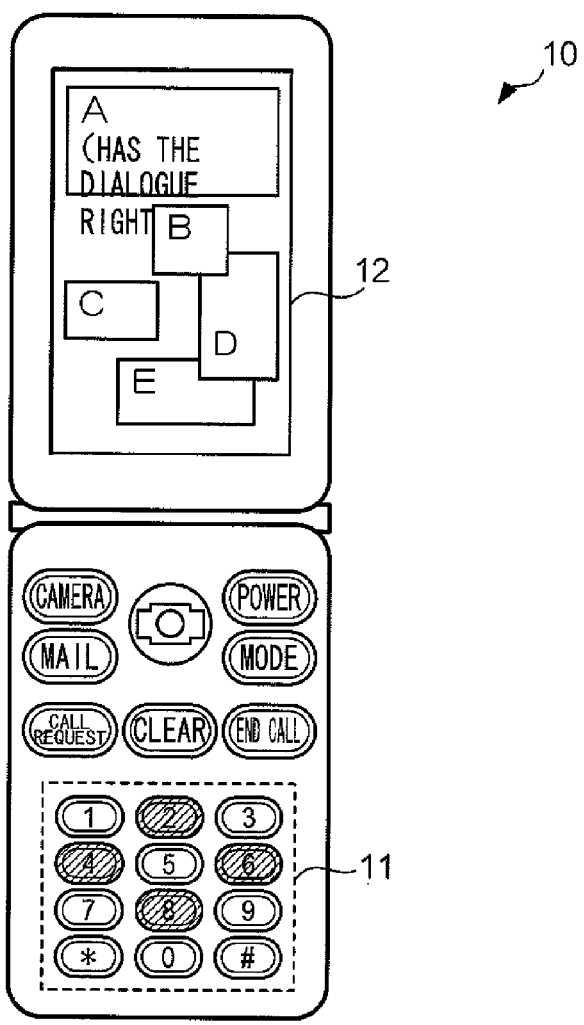
FIG. 23 is a diagram showing a case related to an embodiment of the present invention in which a backlight of a ten-keypad is lighted.

For example, a backlight that can illuminate individual ten-keys may be set under the ten-key input part 11 so that, at Step S108 of the above-mentioned window switching processes 1, 2, instead of superimposing and displaying an image of the ten-key allocated to each window, the backlight is controlled to light the illumination for for example, as shown in FIG. 23—the ten-key "2" allocated to window B, the ten-key "4" allocated to window C, ten-key "6" allocated to window D, and ten-key "8" allocated to window E. Even with such a composition, in addition to achieving a similar effect as in the above-mentioned exemplary embodiment, by not superimposing and displaying images of the ten-keys, the displayed content may be prevented from becoming difficult to see. Of course, it may also be a composition in which lighting control of the backlight is performed along with the superimposition and displaying of the ten-keys.

Figure 24A:
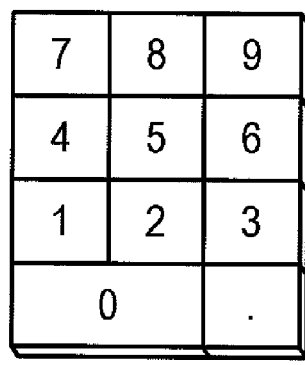
FIG. 24 is a diagram showing a modified example of utilizable keys and an arrangement thereof related to an embodiment of the present invention.
Figure 24B:
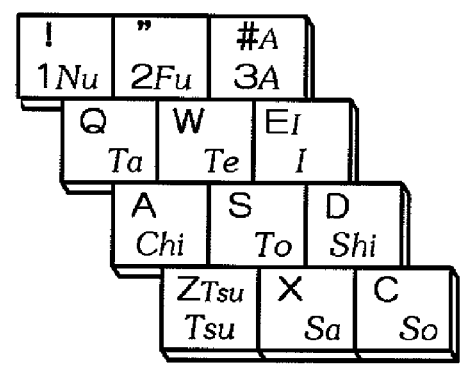

The arrangement of the ten-keys on the ten-key input part 11 is not limited to 4 rows×3 columns For example, it may be 5 rows×3 columns, 2 rows×2 columns, or 3 rows×1 column. Moreover, it may be a ten-key input part 11 a that is included on a keyboard for a personal computer and has an arrangement such as that shown in FIG. 24(a), and as shown in FIG. 24(b), it may use keys for inputting hiragana, katakana, alphabetic characters, numerals, and the like. Keys used as such are not limited to ten-keys, and moreover, the arrangement is not limited to a matrix form.

By executing the OS (program) installed on the nonvolatile memory 18, the mobile telephone 10 (computer) performs processes related to the present invention, such as the window switching processes 1, 2 (refer to FIGS. 4 and 16) and the like, but such programs may be provided to the mobile telephone 10 through transmission, or may be provided by being stored on a recording medium such as a magnetic disk, a flexible disk, an optical recording medium, or the like. Moreover, in the above-mentioned exemplary embodiment, a case in which the present invention is applied to a mobile telephone is described, but the information-processing device to which the present invention may be applied is not limited to a mobile telephone and may be, for example, a PHS (registered trademark) terminal, a wireless communication terminal contained within a public wireless LAN, a personal computer, a PDA, an electronic notebook, or the like. Moreover, as is clear from the mode in which a monitor device (display device) is connected to a computer main body and used, there are cases in which the display is not included in the composition requirements of the information-processing device. Moreover, a transmission function is also not required. Moreover, in the above examples, in the controller 13 of the mobile telephone 10, the CPU executes programs to execute processes including the identification of window positions and the allocation of keys, but these functions may be performed by separate dedicated hardware, for example. That is, so long as the functions of the above-mentioned present invention are realized, the mode of implementation of the hardware and software is not limited to that shown in FIG. 2 or the like.

The invention claimed is:

1. An information-processing device comprising:
    a plurality of keys;
    a memory that stores key arrangement data in a key candidate table indicating an arrangement of said plurality of keys;
    an identification part that identifies each display position of a plurality of windows displayed on a screen and stores the display position in a position identification matrix;
    an allocation part that compares an arrangement of the windows obtained by comparing the display position of each window identified by said identification part and stored in the position identification matrix with the arrangement of keys displayed by said key arrangement data, and uniquely allocates and assigns_to said each window in a key allocation table a key for selecting the relevant window from among said plurality of keys so that the arrangement of said windows and the arrangement of said keys are identical or similar;
    a notifying part that notifies of keys allocated by said allocation part;
    a selection part that selects the window to which an operated key is allocated as defined by the key allocation table when any of the keys notified by said notifying part is operated;
    a determination part that determines whether or not the number of windows displayed on the screen exceeds the number of allocatable keys indicated by said key arrangement data; and
    a sectioning part that, if said determination part determines there is an excess, sections the screen into a plurality of regions so that windows of a quantity equal to or less than the number of said allocatable keys are included within a single region,
    wherein said allocation part allocates a key to each region sectioned by said sectioning part.

2. The information-processing device of claim 1, wherein said identification part identifies the display position of each window, excluding windows with dialogue rights, from among the windows displayed on the screen.

3. The information-processing device of claim 1, wherein said notifying part, for each window displayed on the screen, superimposes and displays an image indicating the key allocated to the relevant window by said allocation part over the relevant window.

4. The information-processing device of claim 1, further comprising an illuminator that illuminates each key of said plurality of keys,
    wherein said notifying part controls said illuminator, and from among said plurality of keys, lights the illumination of the key allocated to said each window by said allocation part.

5. The information-processing device according to claim 1, further comprising:
    a retaining part that compares an arrangement of the windows obtained by comparing the display position of each window identified by said identification part with the arrangement of keys indicated by said key arrangement data and, if the arrangement of said windows and the arrangement of said keys are different, retains the display position of said each window;
a sorting part that sorts the display position of said each window according to the arrangement of said keys; and
a restoration part that, after the selection by said selection part, returns the display position of said each window to the display position of each window retained by said retaining part.

6. A computer program comprising instructions on a non-transitory computer-readable medium, the computer program for causing a computer to realize:
an identification function that identifies the display position of each of a plurality of windows displayed on a screen and stores the display position in a position identification matrix;
an allocation function that compares an arrangement of the windows obtained by comparing the display position of each window identified by said identification function and stored in the position identification matrix with an arrangement of keys indicated by key arrangement data stored in a memory, and uniquely allocates and assigns to said each window in a key allocation table a key for selecting the relevant window from among the plurality of keys indicated by said key arrangement data;
a notifying function that notifies of the keys allocated by said allocation function;
a selection function that selects the window to which an operated key is allocated as defined by the key allocation table when any of the keys notified by said notifying function is operated
a determination function that determines whether or not the number of windows displayed on the screen exceeds the number of allocatable keys indicated by said key arrangement data; and
a sectioning function that, if said determination part determines there is an excess, sections the screen into a plurality of regions so that windows of a quantity equal to or less than the number of said allocatable keys are included within a single region,
wherein said allocation function allocates a key to each region sectioned by said sectioning part.

7. An information-processing device comprising:
a plurality of keys;
a memory that stores key arrangement data in a key candidate table indicating an arrangement of said plurality of keys;
an identification part that identifies each display position of a plurality of windows displayed on a screen and stores the display position in a position identification matrix;
an allocation part that compares an arrangement of the windows obtained by comparing the display position of each window identified by said identification part and stored in the position identification matrix with the arrangement of keys displayed by said key arrangement data, and uniquely allocates and assigns to said each window in a key allocation table a key for selecting the relevant window from among said plurality of keys so that the arrangement of said windows and the arrangement of said keys are identical or similar;
a notifying part that notifies of keys allocated by said allocation part;
a selection part that selects the window to which an operated key is allocated as defined by the key allocation table when any of the keys notified by said notifying part is operated;
a determination part that determines whether or not the number of windows displayed on the screen exceeds the number of allocatable keys indicated by said key arrangement data; and
a configuration part that, if said determination part determines there is an excess, configures a partial region including windows of a quantity equal to or less than the number of said allocatable keys,
wherein said allocation part allocates a key for each window displayed within the partial region configured by said configuration part.

8. A computer program comprising instructions on a non-transitory computer-readable medium, the computer program for causing a computer to realize:
an identification function that identifies the display position of each of a plurality of windows displayed on a screen and stores the display position in a position identification matrix;
an allocation function that compares an arrangement of the windows obtained by comparing the display position of each window identified by said identification function and stored in the position identification matrix with an arrangement of keys indicated by key arrangement data stored in a memory, and uniquely allocates and assigns to said each window in a key allocation table a key for selecting the relevant window from among the plurality of keys indicated by said key arrangement data;
a notifying function that notifies of the keys allocated by said allocation function;
a selection function that selects the window to which an operated key is allocated as defined by the key allocation table when any of the keys notified by said notifying function is operated;
a determination function that determines whether or not the number of windows displayed on the screen exceeds the number of allocatable keys indicated by said key arrangement data; and
a configuration function that, if said determination part determines there is an excess, configures a partial region including windows of a quantity equal to or less than the number of said allocatable keys,
wherein said allocation function allocates a key for each window displayed within the partial region configured by said configuration function.

* * * * *